Figure 1:
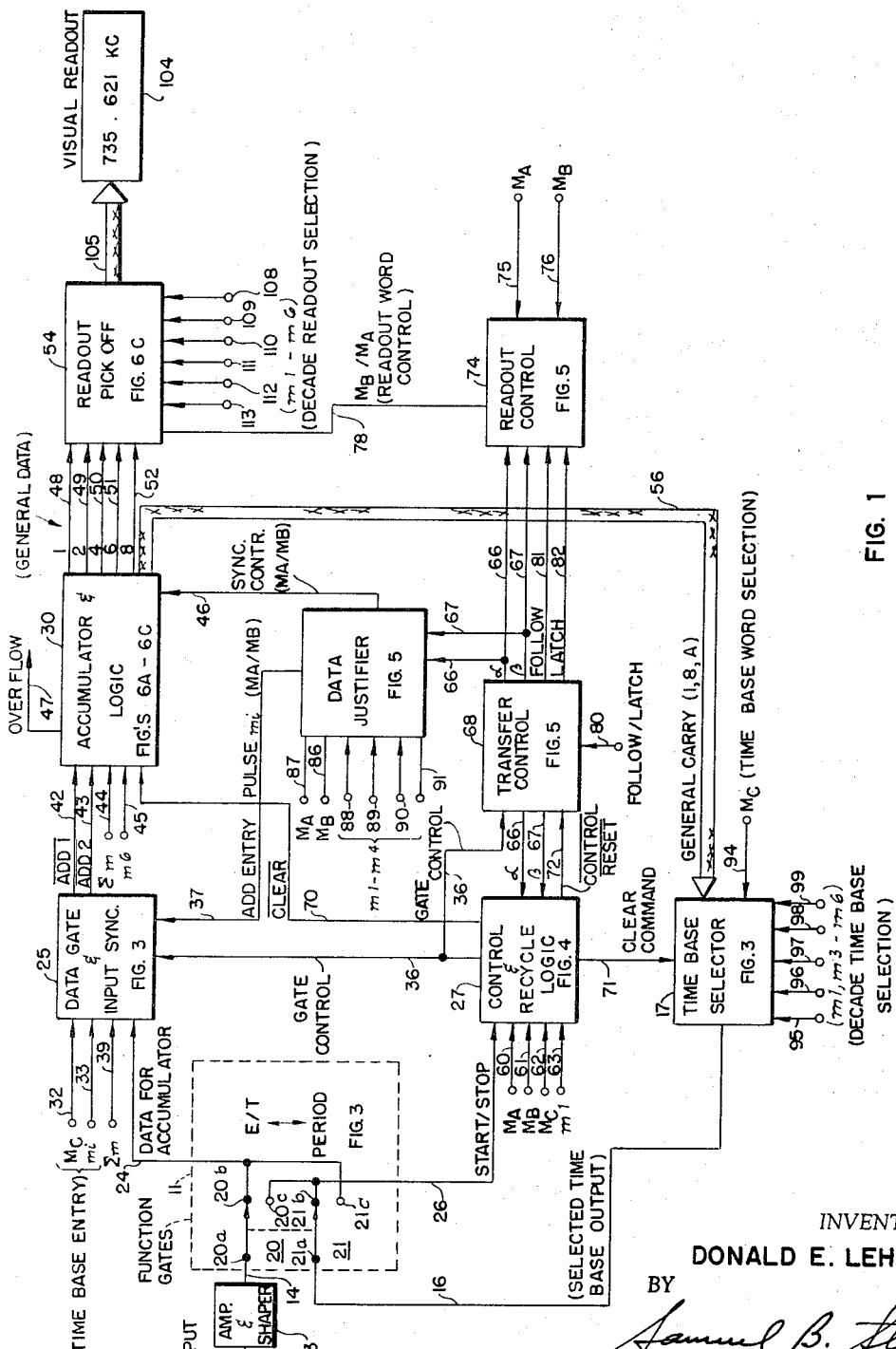

Feb. 20, 1968 D. E. LEHMER 3,370,158
BI-QUINARY COUNTER WITH RECIRCULATING DELAY LINES
Filed March 23, 1964 8 Sheets-Sheet 1

INVENTOR.
DONALD E. LEHMER
BY
Samuel B. Stone
ATTORNEY

Feb. 20, 1968     D. E. LEHMER     3,370,158
BI-QUINARY COUNTER WITH RECIRCULATING DELAY LINES
Filed March 23, 1964     8 Sheets-Sheet 2

INVENTOR.
DONALD E. LEHMER
BY
*Samuel B. Stone*
ATTORNEY

INVENTOR.
DONALD E. LEHMER
BY
*Samuel B. Stone*
ATTORNEY

INVENTOR.
DONALD E. LEHMER
BY
Samuel B. Stone
ATTORNEY

INVENTOR.
DONALD E. LEHMER
BY
Samuel B. Stone
ATTORNEY

INVENTOR.
DONALD E. LEHMER

Feb. 20, 1968     D. E. LEHMER     3,370,158
BI-QUINARY COUNTER WITH RECIRCULATING DELAY LINES
Filed March 23, 1964     8 Sheets-Sheet 8

INVENTOR.
DONALD E. LEHMER
BY
*Samuel B. Stone*
ATTORNEY

3,370,158
BI-QUINARY COUNTER WITH RECIRCULATING DELAY LINES
Donald E. Lehmer, Berkeley, Calif., assignor to Beckman Instruments, Inc., a corporation of California
Filed Mar. 23, 1964, Ser. No. 353,949
5 Claims. (Cl. 235—159)

This invention relates to counters, and more particularly to counters employing recirculating storage devices.

In the present state of the art, there are available various types of counters which automatically count and display the number of events that occur during a period of time. These counters can be employed for any application in which a suitable transducer produces voltage or current changes which represent the occurrence of physical events.

Typically, counters of the prior art include a plurality of cascaded decimal counting units, with each unit counting zero through nine in a decade fashion. These units generally employ bistable flip-flop devices constructed of transistors or vacuum tubes. The cascaded counting units have associated therewith the necessary control and readout logic for controlling the entry of events, or pulses, to be counted, and for reading out the accumulated counts to associated equipment (such as a printer) or for providing a visual display of the accumulated counts by a readout device.

In counting events per unit time (such as for frequency measurement in cycles per second) a time base signal is employed to gate the input events to the counting units for a given period of time (such as one second for measuring cycles per second) determined by the time base. In making "period" measurements (such as wavelength in microseconds per event) the above functions are reversed. That is, the input signal is used to gate time base pulses to the counting units for the period of time determined by the input. Thus, in the period function the input determines the accumulation period with the time standard or time base of typically one megacycle being accumulated.

Considering prior art counters in greater detail, it will be apparent to those skilled in the art that with the exception of the control circuitry, a counter includes essentially an accumulator, a time standard generator and a readout storage device. The accumulator is a storage device capable of remembering each input pulse. Each input pulse can be remembered in a bistable device such as a flip-flop. In order to reduce the number of bistable devices required, and to produce an organized decimal storage of the input pulses, the bistable devices are arranged in groups of four and connected in cascade. Each group is called a decimal counting unit. Only the first bistable device receives the input pulses, passing them on to the others. Four bistable devices in the group can store sixteen input pulses but are arranged to store only ten. The storage capacity is extended by the cascade connection to similar groups of four bistable devices to provide a plurality of decades.

The time standard generator utilized in most instruments is a quartz crystal oscillator operating at one megacycle per second. This is the proper time standard for period measurements, but events per unit time measurements usually require a one-second time interval. This latter interval is generated by accumulating the output of the one megacycle per second oscillator in an accumulator constructed of decimal counting units. The capacity of six such units (six decades) is exceeded after one million input pulses have been stored, and an overflow or carry is generated. The interval between such overflows is one second in duration, and therefore provides the necessary one second time interval for the events per unit time measurement.

The result of the measurement (counts) remains in the accumulator after the measurement is completed. It is usually desired to present this result in a conventional visual decimal display. Frequently some sort of binary coded decimal electrical output also is desired. In order to maintain the display during subsequent measurements (i.e., to read out the results of the accumulation while making the next accumulation), the contents of the accumulator is stored in another binary storage system. This storage system operates the visual display in a parallel manner, and produces a parallel binary coded decimal electrical output.

It will be apparent that the above-described counters are relatively complex, and require a large number of elements such as vacuum tubes or transistors to provide all of the bistable devices and storage functions. It is accordingly an object of the present invention to provide a counter or accumulator which has substantially fewer bistable devices than conventional counters.

It is another object of the present invention to provide an improved counter employing a plurality of circulating storage elements.

It is an additional object of the present invention to provide an improved digital counter which utilizes recirculating storage devices to perform the functions of accumulation, time standard generation and readout storage.

It is a further object of the present invention to provide an improved digital counter which utilizes bi-quinary coded recirculating storage devices to perform the functions of accumulation, and time standard generation.

It is an additional object of the present invention to provide an improved accumulating device which utilizes recirculating storage devices and which enables the simple and efficient realization of data justification.

Another object of the present invention is the provision of an improved counter utilizing recirculating storage devices and in which a general carry is derived for controlling the carry between lines, and between character positions in the lines.

It is a further object of the present invention to provide an improved counter employing a plurality of circulating storage elements which are time-divided to provide the function of accumulation and time base generation.

In accordance with the teachings of the present invention, a counting or accumulating device employs circulating storage devices for providing the functions of accumulation and time base generation. The circulating storage devices may additionally provide output storage for readout. A typical example of such circulating storage devices is a plurality of delay lines. The delay lines are divided in time into a plurality of words. Typically, three words are desired with each of these words providing one of the above functions of accumulation, time base generation and output storage. Thus, each of the recirculating storage devices (the number of which is dependent upon the particular coding employed) is separated essentially into three parts, and this separation is defined by clock pulses. The contents of the word or part which provides the time generation function is increased by one at a predetermined fixed time (such as once every microsecond). Another word or part is employed to accumulate the inputs to be counted, and this word is increased by one on request. A third word, which may be used for data storage, is not increased. Preferably, the latter two words above are utilized alternately for accumulating the input data. The accumulated result remains in the word at the conclusion of the measurement to provide the output storage. The word previously used for storage is cleared and then used to accumulate. Thus, the interchange between these two words ensures that the accumulated data is stored and made available while the other word is utilized for accumulation.

According to a specific exemplary embodiment of the teachings of the present invention shown and described subsequently, a counter is provided which employs five parallel recirculating electromagnetic delay lines each one microsecond in memory duration. That is, the lines have a one microsecond total delay and allow a one megacycle access rate. As will be discussed in greater detail subsequently, a minor clock rate of 21 megacycles may be employed to define three groups of six character storage positions, each separated by a single position which is provided by the deletion of three of the minor clock pulses.

The five delay lines are weighted in a bit-serial, character-parallel, bi-quinary decimal form. The lines are weighted "1," "2," "4," "6" and "8." Each line functions to store "1,s" or "0's." A "0" line is not required for reasons which will become apparent later. Thus, looking at a single line at a given instant of time, the line has stored therein three words, each being separated by a single blank bit, and with each word containing six bits. The bits in all five lines at a particular time constitute a character having parallel bits "1," "2," "4," "6" and "8." The equivalent decimal numerical value of a character is equal to the sum of the weighted lines (in the particular character position) which are true. Only two lines are true at a time (in a given character position). The time of occurrence (i.e., times one through six) of a character determines its position (decade) in a word. As an example, for ultimate readout or visual display, the first character of a storage word typically controls the least significant digit of a readout, the second character controls the next higher significant digit, etc.

In measuring events per unit time for example, the events are accumulated in the accumulator word for a given period of time, such as, one second. The word in the delay lines which provides the time base generation function is incremented by one each microsecond, and the overflow or carry from the sixth character position or sixth decade (indicating 1,000,000 pulses) signals the end of the one second period. The carry from other decades may be used to generate shorter time periods. During this one second, the input pulse or pulses are added to the accumulator word. In the particular example given herein, the counter is a one megacycle counter and, thus, no more than one or two input pulses can be accumulated each microsecond. Carries are provided between lines to cause individual characters to increase in numerical value from 0 through 9, and a carry is provided between adjacent character positions in the lines to provide a carry from one character to the next higher order character.

After the particular measurement has been made, the accumulated data in the accumulator word is available for readout. When the next measurement (accumulation of input pulses) is made, the former accumulator word then functions as the storage word to provide an output to readout devices. The next word (the former storage word) is now employed as the accumulator word. Thus, a single word is employed continuously for time base generation and the remaining two words are employed alternately for accumulate and storage of the previously accumulated data. Before using one of these two latter words for accumulation, it is cleared, i.e., the word previously used for storage is cleared (reset to a numerical value of zero) before a new measurement is made and accumulated in this word.

Figure 2:
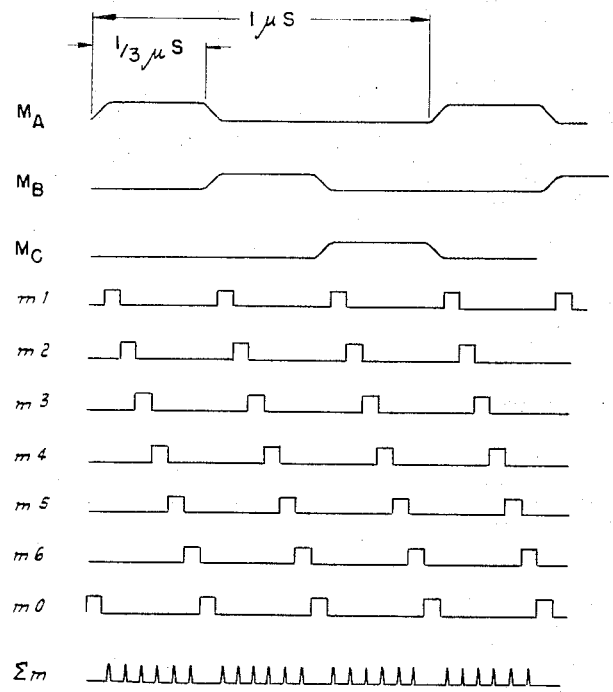
Figure 7:
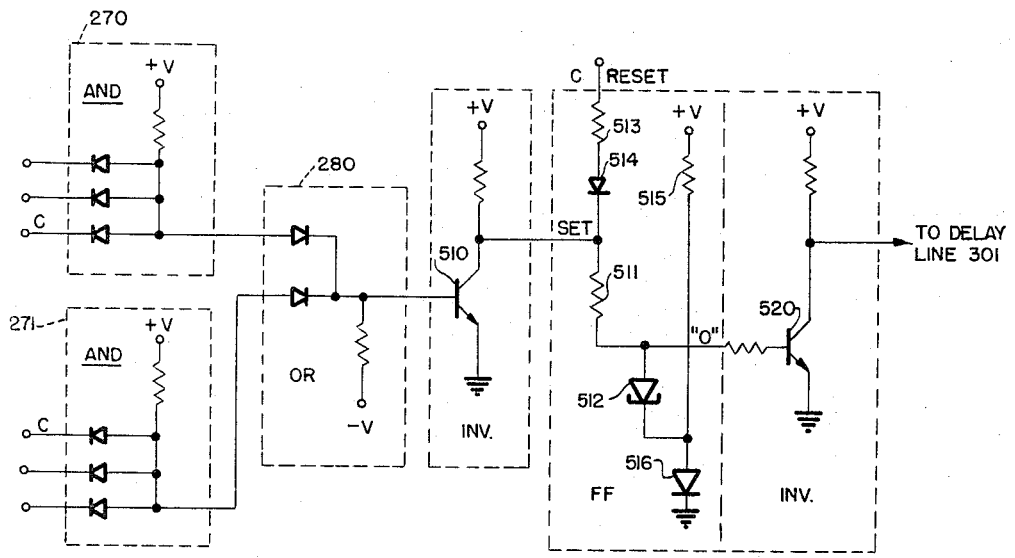
Figure 3:
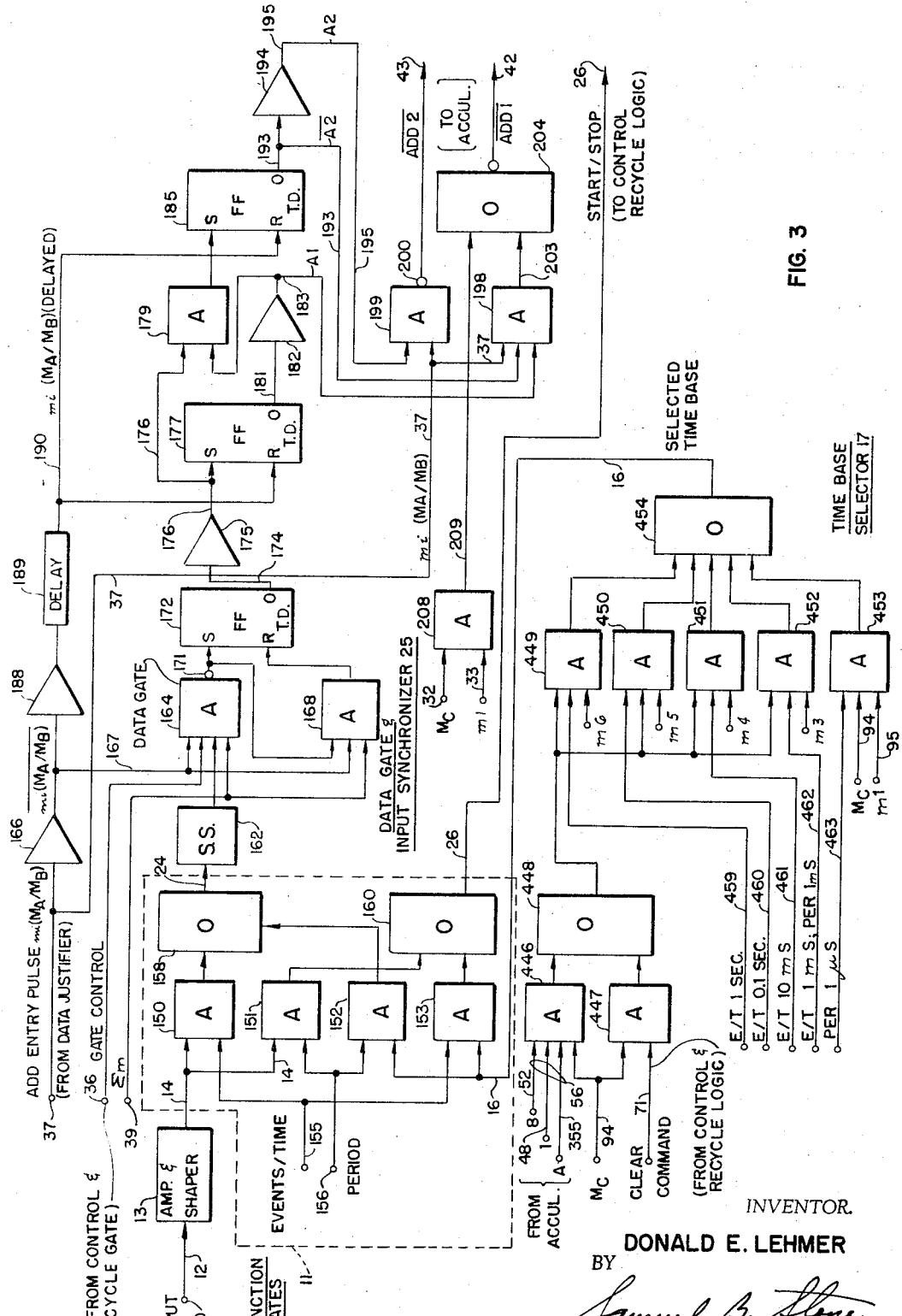
Figure 4:
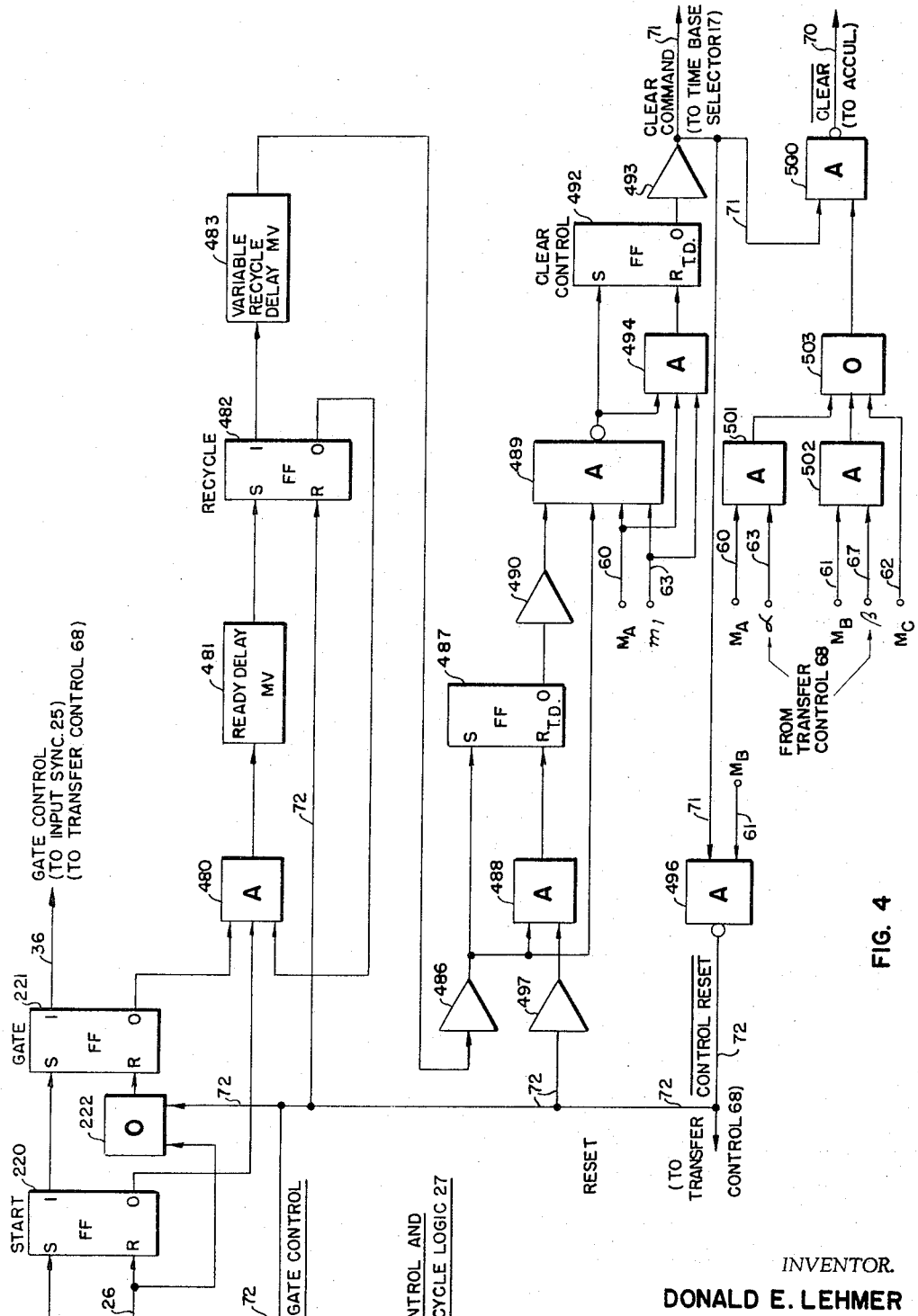
Figure 5:
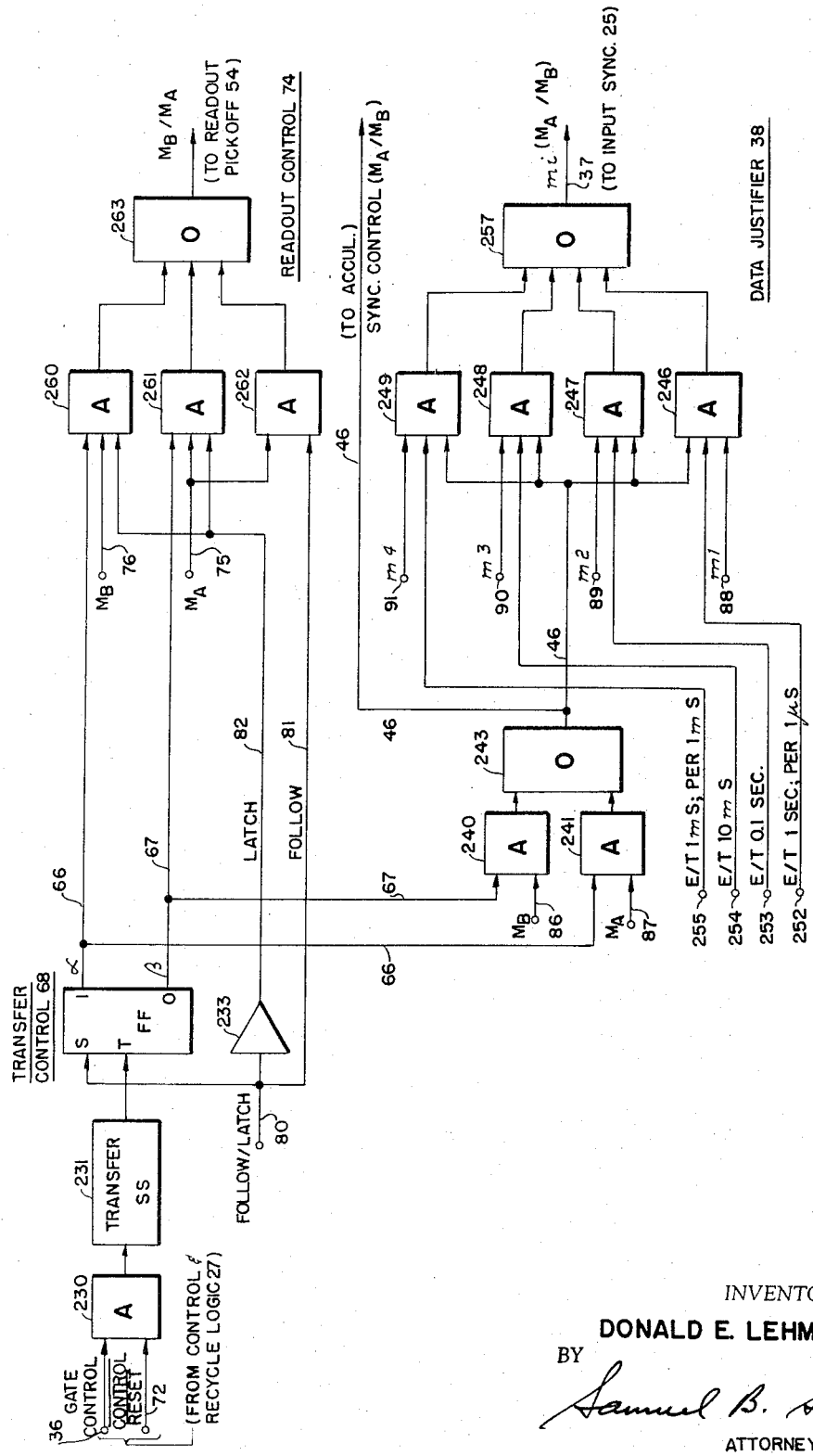
Figures 6A, 6D:
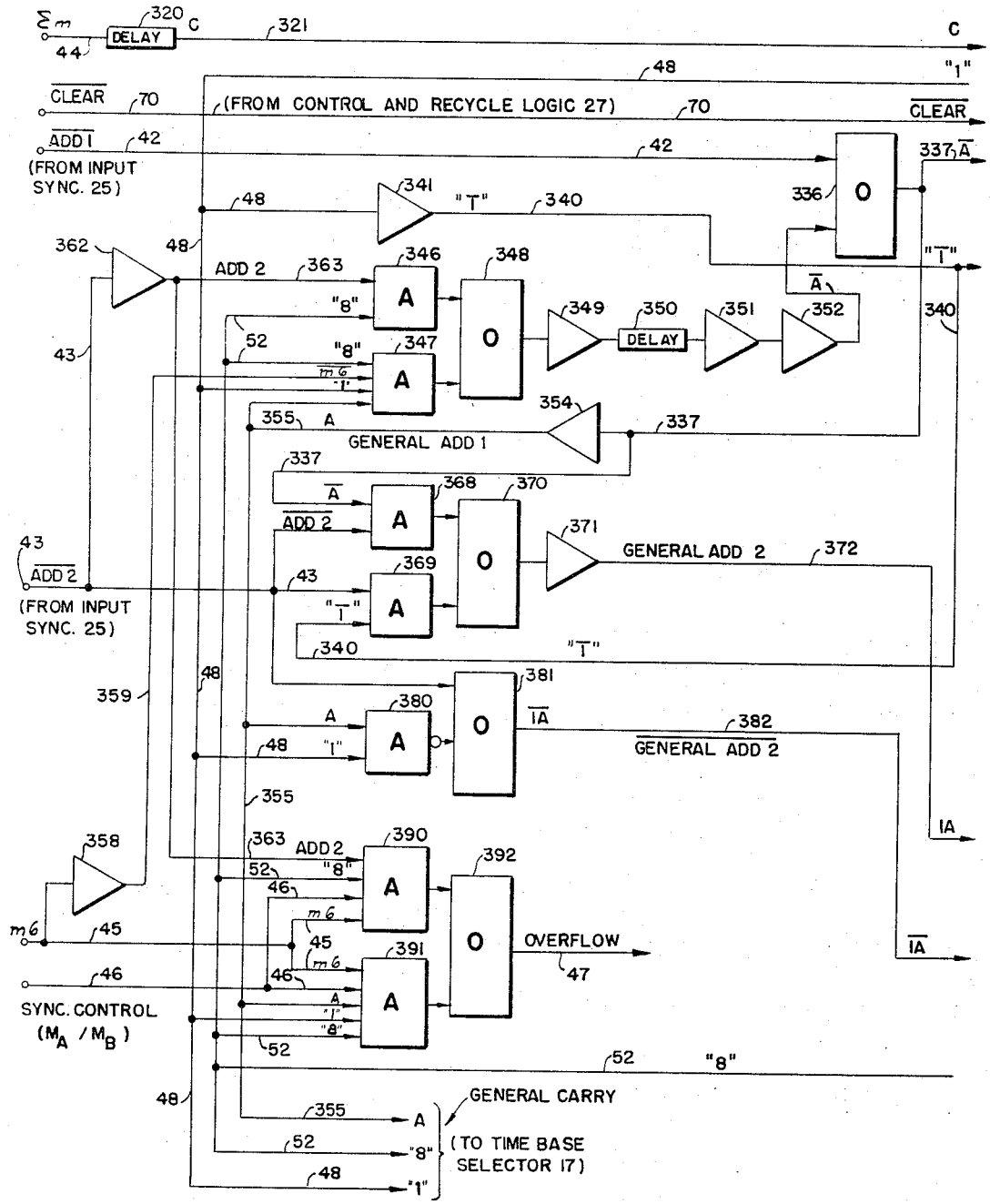
Figure 6B:
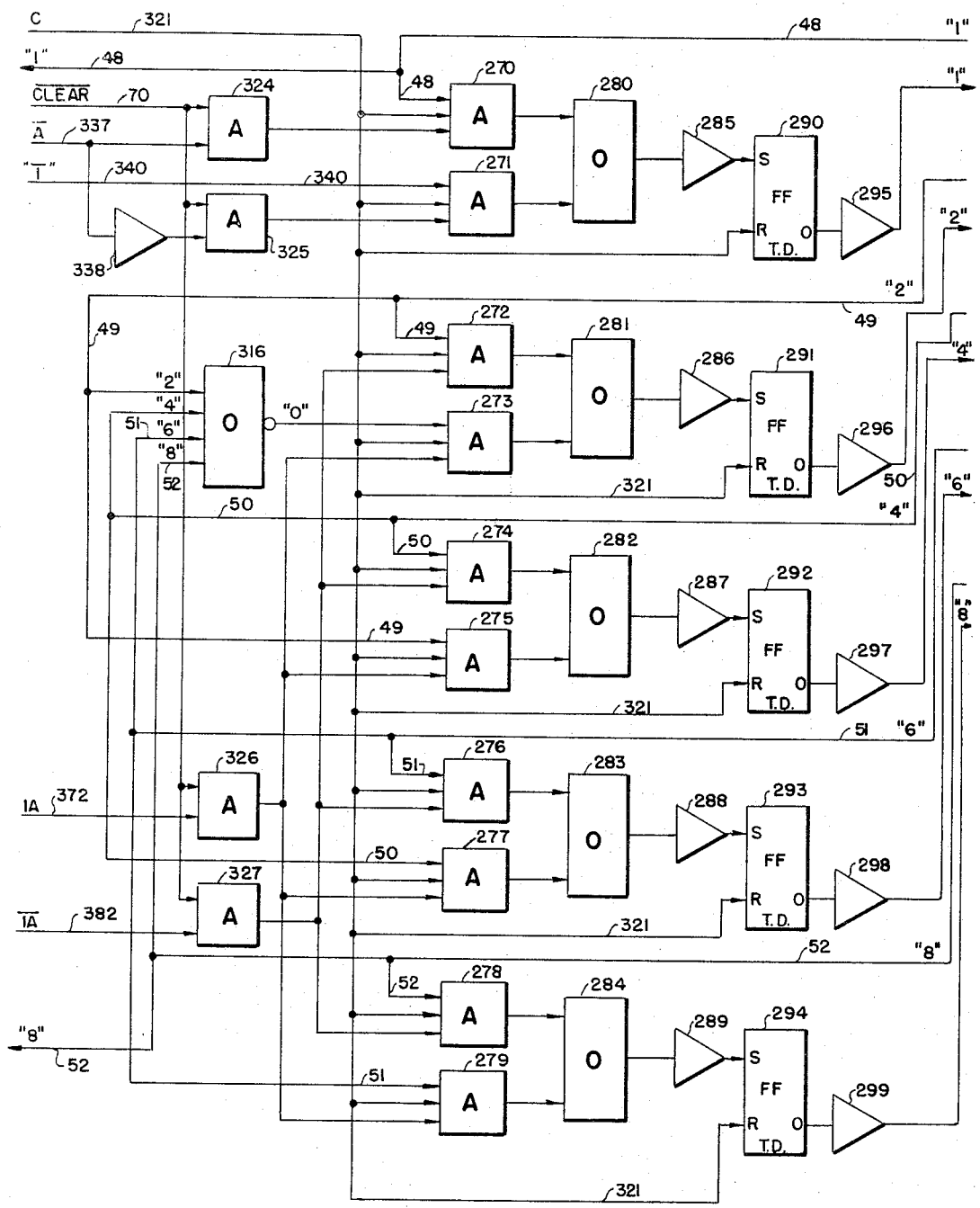
Figure 6C:
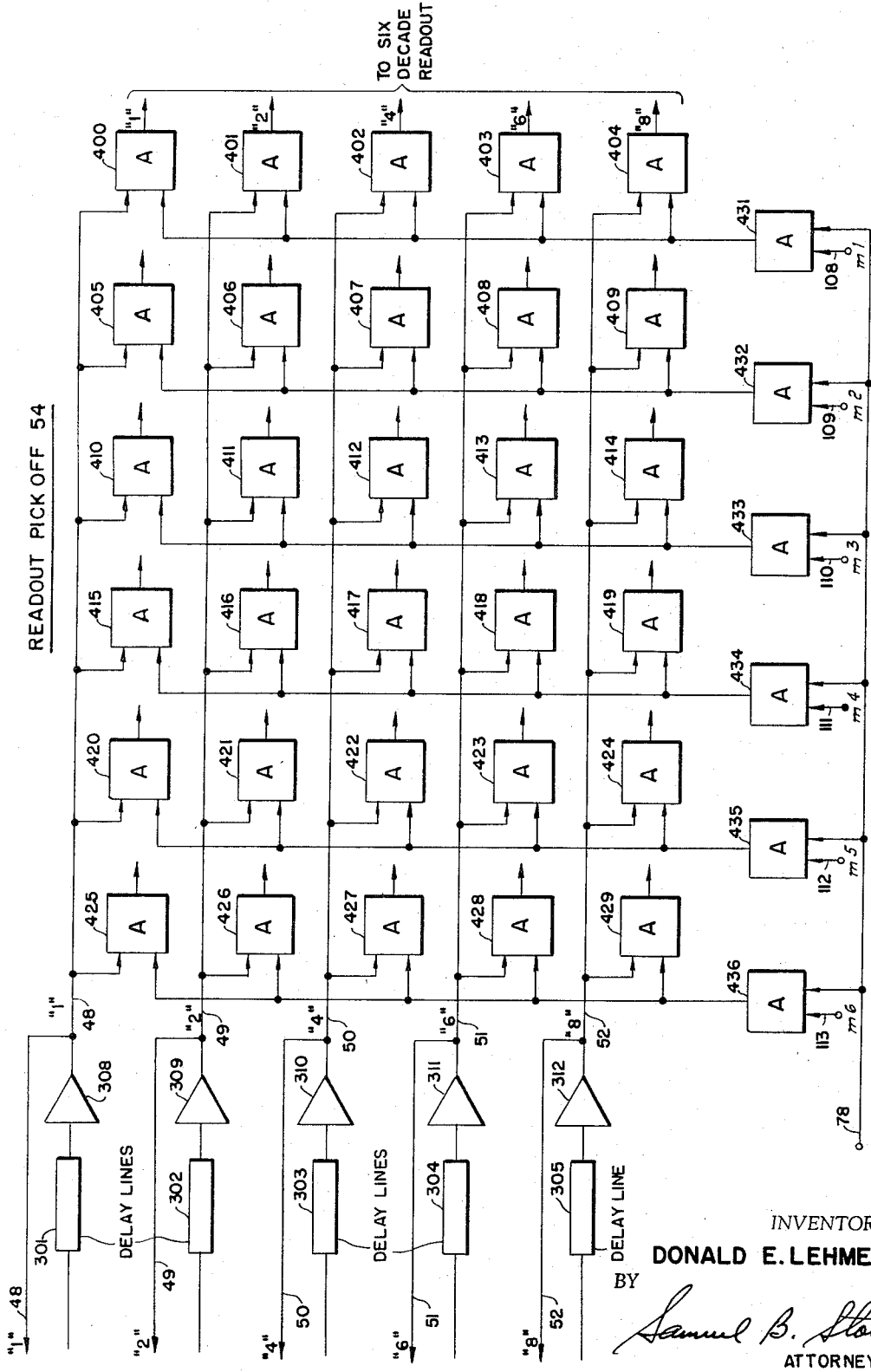

Other features and objects of the invention will be better understood from a consideration of the following detailed description when read in conjunction with the attached drawings in which:

FIG. 1 is a general block diagram of a counter constructed in accordance with the teachings of the present invention;
FIG. 2 is a basic timing diagram;
FIG. 3 is a block diagram showing in greater detail the function gates, data gate and input synchronizer, and time base selector of FIG. 1;
FIG. 4 is a block diagram illustrating in greater detail the control and recycle logic shown in FIG. 1;
FIG. 5 is a block diagram illustrating in greater detail the transfer control, the readout control, and the data justifier shown in FIG. 1;
FIGS. 6a, 6b, and 6c, when arranged as shown in FIG. 6d, illustrate the accumulator and logic, and the readout pickoff shown in FIG. 1; and
FIG. 7 is a circuit diagram illustrating in detail certain of the logical devices employed in the accumulator.

*General discussion*

Referring now to FIG. 1, a specific example of a counter embodying the teachings of the present invention is disclosed in a general block diagram form. FIG. 1 and the description thereof will serve to provide a general understanding of the operation of the exemplary system shown in FIG. 1 which is illustrated in greater detail in FIGS. 3 through 6. The reference numerals associated with the major blocks in FIG. 1 are also utilized to designate the equivalent components in FIGS. 3 through 6. With the exception of input function gates which are shown diagrammatically as mechanical switches in FIG. 1, the reference numerals applied to the various inputs and lines in FIG. 1 are utilized throughout FIGS. 3 through 6.

As noted previously, typical counters are capable of making events per unit time measurements as well as period measurements. Although not necessary for an understanding of the basic concepts of the present invention, the necessary logic and control circuitry is illustrated herein for making these two measurements. The showing of this logic and control circuitry will further the understanding of certain ancillary concepts associated with the present invention, as well as aiding in an understanding of the importance of the basic concepts of the present invention.

An input terminal 10 is connected to function gates 11 by means of a line 12, an amplifier and shaper 13 and a line 14. The input terminal 10 serves to receive electrical input signals indicative of events to be accumulated for a given period of time, or between which time base pulses are to be accumulated for measuring the period between two events. The amplifier and shaper 13 serves to amplify the input pulses and to shape them into discrete pulses. The function gates 11 also receive a time base input on a line 16 from a time base selector 17. Typically, when measuring events per unit time the time base line 16 provides one second pulses, and when measuring period it provides one megacycle pulses.

The function gates 11 are shown diagrammatically as including mechanical switches 20 and 21, respectively including input terminals 20A and 21A, and output terminals 20B and C, and 21B and C. The switches 20 and 21 are mechanically interconnected to operate together. In measuring events per unit time, the switches 20 and 21 are in their uppermost position with input terminal 20A interconnected with output terminal 20B, and input terminal 21A interconnected with output terminal 21B. In this position, the input pulses appearing at the input terminal 20A are supplied to a line 24 which supplies input data for accumulation to a data gate and input synchronizer 25. Likewise in this position, the time base appearing on the input terminal 21A is supplied to an output line 26 which provides start/stop control pulses to control and recycle logic 27. When the switches 20 and 21 are in their lower position, the outputs from the function gates 11 are reversed. That is, the input pulses on the terminal 20A are applied through the line 26 as start/stop pulses to the control and recycle logic 27, and the time base pulses on the input terminal 21A are supplied to the line 24 to the data gate and input synchronizer 25.

The description of FIG. 1 will continue with the switches 20 and 21 considered in their upper position, i.e., positioned for measuring events per unit time.

The data for accumulation is supplied to the data gate and input synchronizer 25 by the line 24. As discussed previously, this data is the amplified and shaped input pulses applied to the input terminal 10 when the function gates 11 are in the E/T (events per unit time) mode. In a sense, the data gate and input sync 25 may be considered as gating input data for accumulation into accumulator and logic 30. Actually, the data gate and input sync 25 function to gate and store one or two input pulses per microsecond and signal the accumulator and logic 30 to add one or two (depending upon whether one or two input pulses have been stored, respectively) in a particular character in the accumulator.

In order to gain a fuller understanding of the individual functional components of FIG. 1 reference should be made to the basic timing diagram illustrated in FIG. 2. FIG. 2 illustrates major clock pulses $M_A$, $M_B$ and $M_C$. As can be seen from FIG. 2, these three clock pulses occur in sequence in one microsecond. It is to be understood, of course, that the particular sequence of word clock pulses and the particular functions they control may be interchanged or altered as desired. For the purposes of illustration and discussion herein, clock pulses $M_A$ and $M_B$ alternately define the accumulate and storage words, and clock pulse $M_C$ defines the time base word. The contents of the time base word is increased by one at a predetermined fixed time (such as once every microsecond). If the word defined by clock pulse $M_A$ is used for accumulation at a particular time, this word is increased by one on request, and the word defined by clock pulse $M_B$ which is used for data storage at this time is not increased. Since the words defined by clock pulses $M_A$ and $M_B$ are used alternately, data will be accumulated subsequently in the word defined by $M_B$ with the word defined by $M_A$ being used for storage.

Seven minor clock pulses $m_0$ through $m_6$ occur during the time (one-third microsecond) of occurrence of each of the three major clock pulses $M_A$ through $M_C$. Six minor clock pulses $m_1$ through $m_6$ occur during a major clock ($M_A$, $M_B$ or $M_C$), with $m_0$ occurring during the transitions of the major clock pulses. Thus, the six minor clock pulses $m_1$ through $m_6$ are utilized to define the six bits within a word. Also, a summation $\Sigma_m$ of the minor clock pulses (with minor clock pulse $m_0$ being deleted) are shown in FIG. 2 which occur with each of the minor clock pulses $m_1$ through $m_6$. The clock pulses are provided by an appropriate clock generator, not shown. When considering a plurality of delay lines, or other logical components within the data recirculation paths, the minor clock pulses $m_1$ through $m_6$ define characters (as versus bits for a single line). The bits comprising any particular word in any delay line travel in synchronism with the corresponding bits of the corresponding word in the remaining delay lines.

Referring back to FIG. 1, a better understanding of the timing diagram shown in FIG. 2 may be had by referring to input terminals 32 and 33 connected to the data gate and input synchronizer 25. Since $M_C$ is considered herein as defining the time base word, and minor clock pulse $m_1$ defines the first (least significant) character in this word, the occurrence of these two clock pulses together will cause the input synchronizer to generate a signal which in turn causes the accumulator to increment the time base word by one. As will be explained subsequently, these two pulses ($M_C$ and $m_1$) are not gated by the data gate portion of the data gate and input synchronizer 25.

In a similar manner, data for accumulation supplied by the line 24 to the data gate and input synchronizer 25 is gated under control of a gate control signal on a line 36 from the control and recycle logic 27, an add entry pulse which is supplied by a line 37 from a data justifier 38, and summation minor clock pulses ($\Sigma_m$) supplied on an input terminal 39. The gate control line 36 supplies a signal in response to the start/stop pulses applied on the line 26 to the control and recycle logic 27 to enable the data gate. The line 37 supplies an add entry pulse which defines which character (one through six) of which word (defined by clock pulse $M_A$ or $M_B$) the data is to be accumulated in. Input terminal 39 supplies the summation minor clock pulses for appropriately synchronizing the operation of the data gate.

The data gate and input synchronizer 25 also includes storage and logical means for storing one or two input data pulses occurring during a given microsecond. That is, if one data input pulse occurs during a microsecond, this is stored. If two data input pulses occur, these are stored. Depending upon whether one or two data input pulses are stored, the data gate and input synchronizer 25 supplies appropriate signals on respective lines 42 and 43 to the accumulator 30 to cause the accumulator to add one or add two, respectively, to the particular character (one through six) of the particular word (defined by $M_A$ or $M_B$) required by the add entry pulse on the line 37. Suppose for example the contents of the accumulation word is 152 and data is being entered in the least significant character (2) (for example the first character of the word defined by clock $M_A$ as determined by the add entry pulse on the line 37). When one input data pulse is gated by the data gate under the control of the gate control signal on the line 36, the number 152 is incremented to the number 153. If two input data pulses are gated by the data gate, the number 152 is incremented to the number 154. Since a one megacycle counter is being described, typically only one data input pulse will occur in one microsecond. However, there are instances in which two such pulses may occur within a microsecond and it is desirable not to lose this information. This will become more apparent subsequently during a detailed discussion of the data gate and input synchronizer 25.

The accumulator 30 also receives summation minor clock pulses on an input terminal 44 for synchronization purposes, and a minor clock pulse $m_6$ on an input terminal 45 for carry control pulses to be discussed subsequently. Additionaly, the accumulator and logic 30 receives an input sync control signal on a line 46 from the data justifier 38. The sync control signal serves a control function with respect to overflow of the accumulator. An overflow signal may be provided on an overflow output line 47 when an overflow (when the accumulation word increases to a decimal value of 999999) occurs.

The concepts, which are a major portion of the present invention, concerning the accumulator and logic 30 will be discussed in greater detail in connection with a description of FIGS. 6a through 6c. Briefly, the accumulator and logic 30 includes a plurality of recirculating delay lines in which data (input data pulses and pulses for time base generation) are accumulated. The accumulator and logic 30 further includes means for controlling the recirculation of data, the incrementation of data in a selected decade by one or two and the appropriate generation of carries between lines to cause individual characters to increase in numerical value from zero through nine and between adjacent character positions (or decades) in the lines to provide a carry from one character to the next higher order character. The general data output of the accumulator is provided by lines 48 through 52 respectively weighted "1," "2," "4," "6," and "8" in bi-quinary coding to a readout pickoff 54. Additionally, a general carry signal is provided by a cable 56 to the time base selector 17.

The control and recycle logic 27 receives start/stop pulses on input line 26 for generating the gate control signal on the line 36 connected to the data gate and input synchronizer 25 as discussed previously. Additionally, the control and recycle logic 27 receives major clock pulses $M_A$, $M_B$ and $M_C$, and minor clock pulse $m_1$ on respective input terminals 60 through 63. This device additionally receives input $\alpha$ and $\beta$ control signals on respective lines 66 and 67 from a transfer control 68. The primary functions of the control and recycle logic 27 are to provide the appropriate gate control signals on the line 36 to the data gate and input synchronizer 25 and to the transfer control 68, and appropriate clear and reset signals on lines 70 through 72 to the accumulator and logic 30, the time base selector 17 and the transfer control 68, respectively. For example, the control and recycle logic 27 provides appropriate clear and reset signals for controlling recycling of the counter after a selectible recycle delay which is provided to allow sufficient time for accumulated input data to be visibly viewed on a readout device or read out by some other device, such as a numeral printer. The control and recycle logic serves to clear (to zero) desired words (defined by $M_A$, $M_B$ and $M_C$) in the accumulator. For example, after accumulation of input data in a word defined by the major clock pulse $M_A$, it is next desired to accumulate the input data in the word defined by the major clock pulse $M_B$ while storing the data already accumulated in the word defined by the major clock pulse $M_A$. In this instance, the contents of the word defined by the major clock $M_B$ must be cleared before input data is accumulated therein. The time base generation word (defined by the major clock pulse $M_C$) is cleared in each cycle of operation. Thus, the contents of the words defined by the major clock pulses $M_A$ and $M_B$ are alternately cleared every other cycle (i.e., word defined by $M_A$ cleared in one cycle, word defined by $M_B$ cleared in the next, word defined by $M_A$ cleared in the next, etc.) and the contents of the word defined by the major clock pulse $M_C$ is cleared every cycle. The alternate clearing of the contents of the former words is controlled by the transfer control 68 and allows a given word to accumulate in one cycle and to store in the following cycle to enable readout of its contents while the next word accumulates.

The transfer control 68 functions to alternately select the word (the word defined by the major clock pulse $M_A$ or the word defined by the clock pulse $M_B$) into which data is to be accumulated alternately. This alternating action of the transfer control 68 is triggered by the gate control pulse supplied by the line 36 from the control and recycle logic 27. For example, if the $\alpha$ line 66 is true, data may be accumulated in the word defined by the major clock pulse $M_A$; whereas, if the $\beta$ line 67 is true, data may be accumulated in the word defined by the major clock pulse $M_B$. The transfer control 68 also supplies these same alternating control signals to a readout control 74. However, when the $\alpha$ line is true the word (the storage word in this example) defined by the major clock pulse $M_B$ is selected by the readout control 74 for readout, and when the $\beta$ line is true, the word defined by the major clock pulse $M_A$ is selected for readout. This particular operation ensures that one of two words accumulates while the other provides storage of previously accumulated data for readout. The readout control 74 additionally receives major clock pulses $M_A$ and $M_B$ on respective input terminals 75 and 76, and provides a readout word control signal on a line 78 to the readout pickoff 54.

The transfer control 68 has an input 80 which supplies a follow/latch input signal. The above operation (alternate selection of words) occurs when the transfer control 68 is in the latch mode (input 80 is false). When a true signal is applied to the input 80, the transfer control 68 operates in the follow mode and selects a single word for both accumulation and readout storage. For example, in the follow mode the $\alpha$ line 66 may be true continuously thereby selecting the word defined by the clock pulse $M_A$ for accumulation, and also select this same word for readout storage. Appropriate follow and latch signals are provided on respective lines 81 and 82 to the readout control 74. In the example given above in the follow mode, the true signal supplied by the line 81 to the readout control 74 overrides the true signals supplied by the $\alpha$ line 66 to the readout control 74.

The data justifier 38 also receives the $\alpha$ and $\beta$ control signals on the respective lines 66 and 67. This device additionally receives major clock pulses $M_A$ and $M_B$, and minor clock pulses $m_1$ through $m_4$ on respective input lines 86 through 91. One of the features of the present invention is the provision of rationalized data readout. The decimal point of data readout does not change position on the visual readout (or other readout device, such as a printer) when the time base period (for example 1 second, 0.1 second, etc.) is altered. The decimal point location and the measurement unit designation (such as kc. for kilocycles) are fixed. For example, the decimal point in a conventional counter readout measuring 735.621 kilocycles would change for different time base periods as follows:

| Time base | Display |
|---|---|
| 1 second | 735621. c.p.s. |
| 0.1 second | 0735.62 kc. |
| 1 millisecond | 000.735 mc. |

The rationalization provided by the data justifier 38 controls the display of the same input as follows:

| Time base | Display |
|---|---|
| 1 second | 735.621 kc. |
| 0.1 second | 735.620 kc. |
| 1 millisecond | 735.000 kc. |

Thus, the data does not effectively change position as the time base period is changed, the decimal point does not change, and the units remain the same. This not only leads to less operator confusion and error, but eliminates the need for remote indication of decimal point and legend. This operation applies both to events per unit time and period measurements.

The data justifier 38 accomplishes the above by time control of data entry into the accumulator. The entry of data into a particular character of an accumulator word is selected (depending, for example, on the time base period chosen) by a particular minor clock pulse $m_1$ through $m_4$ applied on the respective input lines 88 through 91. The specific operation of the data justifier 38 will become readily apparent when the operation of this device is discussed in detail subsequently.

The time base selector 17, which provides a selected time base output on the line 16 to the function gates 11, receives the general carry signal from the cable 56, the major clock pulse $M_C$ on an input 94, and minor clock pulses $m_1$ and $m_3$ through $m_6$ on respective inputs 95 through 99. This selector responds to a general carry which occurs during major clock time $M_C$ and one of the selected minor clock pulses $m_1$ or $m_3$ through $m_6$ to provide the desired time base output. It will be recalled that the contents of the word defined by the major clock pulse $M_C$ are incremented by one each microsecond in the specific counter discussed herein. If the character positions or decades of the time base word (defined by the major clock pulse $M_C$) are analogized to six cascaded decimal counting units with an input to the first decimal counting unit receiving one pulse each microsecond, it will be apparent that the least significant order decimal counting unit will increment numerically from zero through nine and then a carry will be supplied to the next higher order decimal counting unit on the next input pulse with the latter unit then going to a numerical value of one and the former unit going to a numerical value of zero (ten pulses counted). As input pulses continue, the first decimal counting unit increments from zero through nine, provides a carry to the second decimal counting unit, and the latter unit goes to a numerical value of two and the former to zero. This counting operation continues until both the first and second decimal counting units reach a value of 99, at which time a carry is provided to the third decimal counting unit, and the three units store the numerical value 100. When all decimal counting units contain the numerical value 9, the carry from the highest order unit indicates that one million (999999 plus 1 equals 1,000,000) input pulses have been received. Thus, the carry from the sixth decimal counting unit indicates that one million pulses have been received by the cascaded units, and if the input pulse rate is 1 megacycle a time period of one second has elapsed between the first input pulse and the carry pulse from the sixth decimal counting unit. It should then be apparent that the carry from the fifth decimal counting unit indicates that 0.1 second has elapsed, the carry from the fourth decimal counting unit indicates that 0.01 second (10 milliseconds) has elapsed, etc.

The time base selector 17 operates in a manner similar to that described above. A general carry pulse occurs on the line 56 whenever any character (in any word defined by any of the major clock pulses $M_A$, $M_B$ and $M_C$) reaches a numerical value of 9 and a general add 1 command (labeled A) occurs. The major clock pulse $M_C$ is then employed by the time base selector to select the time base word, and a desired decade in that particular word is selected by one of the minor clock pulses $m_1$, $m_3$, $m_4$, $m_5$ or $m_6$. Thus, if the general carry line 56 is true, the major clock $M_C$ is present on the line 94 and the minor clock pulse $m_6$ is present on the line 99, the time base output on the output line 16 is one second (one second between time base pulses). If the minor clock pulse $m_5$ is true in this case rather than the minor clock pulse $m_6$, a time base output of 0.1 second is provided. In a similar manner, the minor clock pulse $m_4$ may be employed to select a time base of 10 milliseconds, the minor clock pulse $m_3$ employed to select a time base of 1 millisecond, and the minor clock pulse $m_1$ employed to select a time base of 1 microsecond. It will be noted that the input clock pulse $m_2$ is not employed. This is because typically the time base provided by this particular minor clock pulse is not employed in practice. It will be apparent after a detailed discussion of the components employed in the time base selector 17 and the concepts utilized in the accumulator and logic 30 that the manner of selecting a time base output is simple and unique.

The readout pickoff 54 receives the general data from the accumulator 30 and selects the appropriate word, and the characters therein sequentially, for transfer to readout devices such as a visual readout 104 (or other readout devices, such as printers) by means of a cable 105 connected to the readout pickoff 54. Input lines 108 through 113 supply respective minor clock pulses $m_1$ through $m_6$. If the word which is accumulating is defined by the major clock pulse $M_B$, it is desired to read out the contents of the word defined by the major clock pulse $M_A$ which was previously used for accumulation (assuming the transfer control 68 is in the latch mode and these two words are alternately used for accumulation). The contents of the word defined by the major clock pulse $M_A$ (now functioning as a storage word) is interrogated in time synchronism with the characters (the delay lines in the accumulator are weighted in a bit-serial, character-parallel form) of this word by the minor clock pulses $m_1$ through $m_6$. Thus, for example, $m_1$ selects the least significant character for readout, $m_2$ selects the next higher order character for readout, etc. The numerals 735.621 shown on the visual readout 104 are gated to the readout in a timed sequence from least significant numeral to most significant. This gating operation occurs in one third of a microsecond (the duration of the major clock pulse $M_A$) but occurs again in one microsecond with the occurrence of the major clock pulse $M_A$. The visual readout 104 then provides a visual output for a period of time (such as 1 to 10 seconds) selected by the control and recycle logic 27. This particular operation will be discussed in greater detail subsequently.

*Data gate and input synchronizer*

Referring now to FIG. 3, the function gates 11, data gate and input synchronizer 25 and time base selector 17 are shown therein in greater detail. The input terminal 11 is shown connected through the amplifier and shaper 13 to the function gates 11 as in FIG. 1. Although the function gates 11 are shown in FIG. 1 as mechanical switches to facilitate the description therein, they are preferably constructed of logical And gates 150 through 153. Such gates are well known in the art, and as used herein provide a true output when all inputs are true. The line 14 from the amplifier and shaper 13 is connected to inputs of And gates 150 and 151. The time base on the line 16 from the time base selector 17 is connected to the inputs of And gates 152 and 153. An E/T (events per unit time) enable input is provided on a line 155 to the And gates 150 and 153. A period enable input is provided on an input 156 to the And gates 151 and 152. The outputs of the And gates 150 and 152 are connected through an Or circuit 158 to the data output line 24 of the function gates 11. The outputs of the And gates 151 and 153 are connected through an Or circuit 160 to the start/stop output line 26.

It will be readily apparent to those skilled in the art that if the E/T enable input 155 is true and a pulse output occurs from the amplifier and shaper 13, both inputs to the And gate 150 are true. In this case the And gate 150 provides a true output through the Or circuit 158 to the output line 24. Likewise, when the E/T enable input 156 is true and a time base pulse is received on the line 16, both inputs to the And gate 153 are true. In this case, the And gate 153 provides a true output through the Or circuit 160 to the output start/stop line 26. Conversely, when the period input is true on the line 156, the pulses from the amplifier and shaper 13 are gated by the And gate 151 through the Or circuit 160 to the output line 26, and the time base pulses are gated by the And gate 152 and the Or circuit 158 to the output line 24.

The output line 24 of the function gates 11 is connected to a single shot 162 which functions as a pulse stretcher to ensure that the input data to be accumulated may be gated against the summation minor clock pulses and assured of coincidence. The output of the single shot 162 is applied on a line 163 to an input of data gate 164. The data gate 164 is the input data gate discussed in connection with FIG. 1 which opens for a predetermined time to allow input data which is to be accumulated to pass therethrough. The data gate 164 also receives the summation minor clock pulses $\Sigma_m$ on the line 39. The gate control signal from the control and recycle logic 27 is applied on the line 37 as an input to the data gate 164. The add entry pulse, which determines which character of which of two words is incremented, is applied on the line 37 to an inverter 166. The triangular symbol used for the inverter 166 is used throughout the various figures to illustrate an inverter. The inverter may additionally provide pulse amplification if desired. Thus, the output of the inverter 166 is the inverse of its input, or in logical terminology, $\overline{\text{add entry pulse}}$, which means that the output of the inverter 166 is true whenever an add entry pulse is not present at its input, and is false when an add entry pulse is present at its input. The add entry pulse at the input of the inverter 166 may be termed $m_i(M_A/M_B)$, and at the output $\overline{m_i(M_A/M_B)}$. The logical expression $m_i(M_A/M_B)$ indicates which character defined by one of the minor clocks $m_1$ through $m_6$ of which word defined by either $M_A$ or $M_B$ is to be incremented in the accumulator. The $\overline{m_i(M_A/M_B)}$ then is true and enables the data gate 164, and a reset gate 168, during all summation minor clock pulses except one. For example, if data is to be accumulated in the lowest order character position of the word defined by $M_A$, the add entry pulse would be $m_1(M_A)$ which occurs only once per microsecond.

The output of the data gate 164 is inverted and applied to an output line 170. For simplicity of illustration, a circular symbol 171 is shown on the output of the data gate 164. Where this circle is used on gates throughout the various figures, it indicates that the output of the particular gate is inverted (the same as accomplished by the triangular inverter symbol). The line 170 is connected to the set input of a sync flip-flop 172. This flip-flop is a tunnel diode flip-flop which will be discussed in greater detail in connection with a description of FIG. 7. When all inputs to the And gate 164 are true, the output line 170 supplies the necessary set signal to the flip-flop 172. The set and reset inputs of the tunnel diode flip-flops respond to different polarity inputs (such as, negative for set and positive for reset). It is to be understood that true and false inputs and outputs may be of any particular voltage level or polarity as desired and as dictated by the particular logical components employed. The line 170 is also connected as an input to the And gate 168. The output of the And gate 168 is connected to the reset input of the flip-flop 172 which serves to subsequently reset the flip-flop 172. A reset signal is supplied by the gate 168 when all of its inputs are true. Essentially, the flip-flop 172 follows the output of the single shot 162, but synchronizes this output with the summation minor clock pulses. The flip-flop 172 sets, with the occurrence of the first summation minor clock pulse $\Sigma_m$ after the occurrence of the output of the single shot 162 and resets on a summation minor clock pulse after the single shot 162 resets.

The zero output of the flip-flop 172 is connected through a line 174, an inverter 175 and a line 176 to the set input of a flip-flop 177. The flip-flop 177 also is a tunnel diode flip-flop. The line 176 also is connected to an input of an And gate 179. The zero output of the flip-flop 177 is connected through a line 181, an inverter 182 and a line 183 (labeled A1) to the And gate 179. The output of the And gate 179 is connected to the set input of another tunnel diode flip-flop 185. The flip-flops 177 and 185 essentially function as devices for storing one or two input data pulses which occur during one microsecond. The output of the flip-flop 172 is A.C. coupled to provide an output pulse only when this flip-flop goes from zero to one (reset to set). If an input pulse occurs during the one microsecond interval (the total interval defined by the three major clock pulses) the first flip-flop 177 is set. If an additional input pulse occurs during this one microsecond when the flip-flop 177 is already set, the next flip-flop 185 is set by the second input (as indicated by the second change in the sync flip-flop 172). his particular operation occurs when the input data rate exceeds one megacycle. The use of the two flip-flops 177 and 185 ensures that if two input pulses occur during 1 microsecond, the second pulse is not lost. If there were no chance of a second pulse occurring during the 1 microsecond interval, the second flip-flop 185 would not be required. A summation minor clock pulse (defined by $m_i$ in the add entry pulse) is deleted during resetting of the flip-flops 177 and 185 to prevent these flip-flops (and the flip-flop 172) from being set during reset time. This occurs because the line 167 connected to gates 164 and 168 goes false.

The output of the inverter 166 is supplied on the line 167 through an inverter 188, a delay 189 and a line 190 to the reset input of each of the flip-flops 177 and 185. The signal on the line 190 resets the flip-flops 177 and 185 each microsecond. The reset signal occurs slightly after the add clock signal $m_i(M_A/M_B)$ in order to ensure that the add one and add two signals (to be discussed subsequently) from the data gate and input synchronizer are supplied to the accumulator before these flip-flops 177 and 185 are reset. The delay provided by 189 may be on the order of 10 to 15 nanoseconds and supplied by a short delay line or similar delay device.

True outputs from the flip-flops 177 and 185 are derived and employed in providing add signals to the accumulator. A true output is derived from the flip-flop 177 on the line 183 by means of the inverter 182. When the flip-flop 177 is set to its one state its "0" output on the line 181 is false. This output is inverted by the inverter 182 to provide a true output when the flip-flop 177 is in the set state. In a similar manner, the zero output of the flip-flop 185 is connected through a line 193, an inverter 194 and a line 195 to provide a true output when the flip-flop 185 is set. The line 183 is connected to an And gate 198. The line 193 from the zero output of the flip-flop 185 also is connected to this And gate. The add entry pulse $m_i(M_A/M_B)$ on the line 137 is connected to the And gate 198 and to an And gate 199. The line 195 also is connected to the And gate 199. The circular symbol 200 indicates that the And gate 199 is inverting. When the Add entry pulse on the line 37 is true and the flip-flop 185 is set (line 195 is true) both inputs to the And gate 199 are true. Because of the inversion, it may be stated that the output line 43 from the And gate 199 indicates that the add 2 signal is false, or stated an equivalent way in logic notation, $\overline{\text{add 2}}$ is true. Although it is sometimes confusing to speak of Not signals, such as $\overline{\text{add 2}}$ this is logically correct. In the particular instance, the output of the And gate 199 could be denoted as a true add 2 signal. However, sometimes in practice it is desirable to carry so-called Not signals from logical elements to logical elements. In this case, it is necessary to amplify the output of the And gate 199. If this is done with one transistor, for example, its output is inverted and is $\overline{\text{add 2}}$. Two transistors could have been employed on the output of the And gate 199 to doubly invert the output providing add 2. Thus, it will be apparent that by carrying so-called Not signals (such as $\overline{\text{add 2}}$) an active element (one transistor) is eliminated along with any time delay resulting from this active element.

When the add entry pulse on the line 37 is true, the flip-flop 177 is in its one state (the line 183 is true), and the flip-flop 185 is in its zero state (the line 193 is true) all inputs to the And gate 198 are true, and its output is true. The output of the And gate 198 is applied through a line 203 to an Or gate 204. The Or gate 204 is inverting and provides an $\overline{\text{add 1}}$ output on the line 42 in this case. Thus, flip-flops 177 and 185 indicate whether a character is to be incremented by one or two, and the particular character and word is defined by the add entry pulse on the line 37.

By employing two flip-flops 177 and 185, the counter can operate at the rate of two megacycles without increasing a random error of $\pm 1$ count. This is true because of the placement of the data gate 164. Since it is placed before the storage flip-flops 177 and 185 rather than after, the number of input cycles seen by these flip-flops is controlled by the gate interval. At an input rate of two megacycles these flip-flops will cause the accumulator to scale by two. The resolution and counting rate can further be increased by utilizing more flip-flops in the input synchronizer and by providing more add control outputs other than add 1 and add 2. If, for example, four flip-flops were employed instead of the two shown, it would be possible to increment by any value from 1 through 15. The counter would then operate as a 15 megacycle device.

It will be recalled that the time base word (defined by the major clock pulse $M_C$) is incremented once each microsecond. This incrementation is controlled by an And gate 208 which receives the major clock pulse $M_C$ on the input 32 and the minor clock pulse $m_1$ on the input 33. When both of these inputs are true, the And gate 208 provides a true output on a line 209 to the Or gate 204. Thus, the true condition of the line 209 indicates that the first character (defined by the minor clock pulse $m_1$) of the time base word (defined by the major clock pulse $M_C$) is to be incremented by one. A description of the time base selector 17 shown in detail in the lower portion of FIG. 3 will be deferred until the accumulator and logic 30 has been discussed in detail.

Gate control

Referring now to FIG. 4, the control and recycle logic is shown which provides the gate control signals to the data gate and input synchronizer 25 and the transfer control 68 in FIG. 1, as well as various clear and reset signals. At this point, only the gate control function will be discussed, with the recycling function being discussed in greater detail subsequently.

The gate control signal is provided by a start flip-flop 220 and a gate flip-flop 221. These flip-flops are conventional bistable devices and function to provide an output gate control pulse on the line 36 to open the data gate 164 in FIG. 3 for a period of time (and to thereafter remain closed until recycle) determined by the start/stop input pulses applied on the input 26 after the flip-flop 220 to set and the flip-flop 221 to reset. Essentially, a start pulse causes the gate flip-flop 221 to set to its one state and the following stop pulse causes the flip-flop to reset to its zero state. The start/stop input is applied through the line 26 to the reset input of the start flip-flop 220, and through an Or circuit 222 to the reset input of the gate flip-flop 221. The line 72 is connected to the set input of the flip-flop 220 and through the Or circuit 222 to the reset input of the flip-flop 221. The start flip-flop 220 is set and the gate flip-flop 221 is reset by a $\overline{\text{control reset}}$ signal on the line 72. A Not control reset (as indicated by the bar over the word "control reset") is shown since each of the set and reset inputs of the flip-flops 220 and 221 respond to negative-going input signals. However, it is to be understood that these flip-flops may be controlled by other type signals as desired. Thus, after a $\overline{\text{control reset}}$ signal is applied (indicating the counter is ready to make a new measurement), the start pulse on the input 26 causes the start flip-flop 220 to reset, and the gate flip-flop 221 sets to its one state providing a true output on the line 36. The output of the start flip-flop 220 is A.C. coupled to the set input of the gate flip-flop 221 and when the flip-flop 220 resets, the start flip-flop 221 sets. This set input to the start flip-flop 221 overrides the reset input (from the start pulse on the line 26 and through the Or circuit 222) at this time. The subsequent stop pulse on the input 26 resets the gate flip-flop 221. This stop pulses does not affect the start flip-flop 220 because it is already reset. This operation causes the output 36 of the gate flip-flop 221 to be true for a period of time determined by the start and stop input pulses. The gate flip-flop 221 cannot again be set until the start flip-flop 220 is first set (provided by the $\overline{\text{control reset}}$ line 72 when it is time for a new measurement). As noted previously, the start/stop input pulses are time base pulses when events per unit time are being measured, and are the input event pulses during period measurements. The gate control signals on the line 36 are applied to the input data gate 164 in FIG. 3 as previously discussed, and are applied to the transfer control circuit 68.

Transfer control

Referring now to FIG. 5, the transfer control circuit 68 is shown in detail, as well as the readout control 74 and the data justifier 38. The transfer control 68 includes an input And gate 230, a transfer delay single shot 231, a transfer flip-flop 232 and an inverter 233. The gate control and the $\overline{\text{control reset}}$ signals are coupled from the control and recycle logic 27 (FIG. 4) by means of respective lines 36 and 72 to the And gate 230. The output of the And gate is connected to the transfer single shot 231 which triggers on the trailing edge of the gate control signal. The $\overline{\text{control reset}}$ applied on the line 72 to the And gate 230 is utilized to prevent triggering of the transfer single shot 231 when the $\overline{\text{control reset}}$ is false. That is, triggering of the single shot 231 is prevented when the start flip-flop 220 (FIG. 4) is being set and the gate flip-flop 221 is being reset.

The transfer single shot 231 functions to trigger the transfer flip-flop 232 in the latch mode. It will be recalled that in the latch mode as discussed in connection with FIG. 1, the $\alpha$ and $\beta$ output lines 66 and 67 are alternately true to provide for the alternate accumulation in the two words defined by the major clock pulses $M_A$ and $M_B$. A typical delay provided by the transfer single shot 231 is approximately 1.25 microseconds to ensure that the add command or commands from the input synchronizer are completely read out to the accumulator before transfer of words occurs. That is, the transfer flip-flop 232 is triggered 1.25 microseconds after the trailing edge of the gate control signal. The outputs of the transfer flip-flop are provided on the lines 66 and 67. When the transfer flip-flop 232 is set to its one state the $\alpha$ line 66 is true, and when set to its zero state the $\beta$ line 67 is true.

In the follow mode, a true follow input is applied to the follow/latch input 80 and to the set input of the flip-flop 232. This input holds the transfer flip-flop 232 in its set state (the $\alpha$ output is true). The follow signal on the set input of the flip-flop 232 prevails over any trigger input.

The $\alpha$ and $\beta$ lines 66 and 67, respectively, are applied to the inputs of respective And gates 240 and 241 in the data justifier shown in detail in FIG. 5. These two And gates 240 and 241 also receive respective major clock inputs $M_B$ and $M_A$ on the input lines 86 and 87, respectively. The outputs of the And gates 240 and 241 are connected through an Or gate 243 to an output line 46. The output line 46 provides a sync control signal which indicates which of the words defined by the major clock pulses $M_A$ or $M_B$ is presently being used as the accumulation word. That is, if the $\alpha$ line 66 is true and the major clock pulse $M_A$ is present, the And gate 241 provides an output through the Or gate 243 which indicates that the word defined by the clock pulse $M_A$ is presently being used for accumulation. The output line 46 is connected to the accumulator 30 to provide a sync control signal for indicating an overflow at an appropriate time, and this particular operation will be discussed in greater detail subsequently in connection with a detailed discussion of the accumulator and logic 30.

The line 46 also is connected as an input to And gates 246 through 249. The lines 88 through 91 (discussesd in connection with FIG. 1) which supply the respective minor clock pulses $m_1$ through $m_4$ are connected to the respective And gates 246 through 249. Enable input lines 252 through 255 also are connected to the inputs of respective And gates 246 through 249. The outputs of the And gates 246 through 249 are connected through an Or gate 257 to the output line 37 which supplies the add entry pulse $m_i(M_A/M_B)$. As noted previously, the add entry pulse defines the word (defined by the clock pulse $M_A$ or $M_B$ and the true condition of the $\alpha$ or $\beta$ line) and the particular character (defined by $m_i$ i.e., one of the minor clock pulses $m_1$ through $m_4$) in that word into which input data is to be accumulated. In a typical case in measuring events per unit time, it is desired to measure input events which occur during a one second period. The input lines 252 through 255 are typically selected by a selector switch on the instrument and in the present example (measuring events per one second) the line 252 is true. Assuming that the $\alpha$ line 66 is true and that the clock pulse $M_A$ is true, upon the occurrence of the minor clock pulse $m_1$ all of the inputs to the And gate 246 are true thereby providing a true output through the Or gate 257 to the output line 37. The signal on the output line 37 then defines the first character in the word defined by the clock pulse $M_A$. The one or two input pulses applied to the input synchronizer 25 (FIG. 3) will then be accumulated in the first character of the word defined by $M_A$. In a similar manner, any one of the other enable input lines 253 through 255 may be made true to select the particular character position, or decade, of the accumulator word into which the input data will be accumulated.

Data justifier

The data justifier 38 illustrated in FIG. 5 provides the justification of data discussed previously. That is, the decimal point and the measurement units remain constant from the readout by virtue of the fact that the data may be selectively directed to a particular character in the accumulation word rather than always to the least significant character, or decade, as is typically the case with cascaded decimal counting units in conventional counters. It should be realized that although the necessary logical components for gating the data for accumulation into the first four characters, or decades, has been illustrated, if desired similar components may be provided for gating this data into any character position or decade.

Readout control

The readout control 74 shown in FIG. 5 includes three And gates 260 through 262 and an Or gate 263. The $\alpha$ line 66 is connected to the And gate 260, and the $\beta$ line 67 is connected to the And gate 261. The major clock pulses $M_B$ and $M_A$ are applied on respective lines 76 and 75 to the And gates 260 and 261, respectively. The latch control signal (the inverse of the follow signal) is applied on the line 82 to both of the And gates 260 and 261. The follow control line 81 is connected to the And gate 262, and the clock pulse $M_A$ on line 75 also is connected to this And gate. The outputs of the And gates 260 through 262 are connected through the Or gate 263 to the output line 78. The output line 78, as previously mentioned, supplies a signal to the readout pickoff to indicate which of the words defined by the clock pulse $M_A$ or $M_B$ is to be stored for readout.

As was previously discussed, if the word defined by the clock pulse $M_A$ is being used for accumulation, the word defined by the clock pulse $M_B$ is used for readout storage if the instrument is in the latch mode. For example, assuming a false input at the follow input 80, the latch line 82 is true. If the $\alpha$ line 66 is true and the major clock pulse $M_B$ occurs, the And gate 260 provides a true output indicating that the contents of the word defined by the major clock pulse $M_B$ are to be stored for readout. In this particular instance, it will be recalled that the true $\alpha$ signal is applied to the And gate 241 in the data justifier 38 which allows input data to be accumulated in the word defined by the clock pulse $M_A$. Conversely, if the $\beta$ line 67 is true and the major clock pulse $M_A$ occurs, the contents of the word defined by the clock pulse $M_A$ are stored for readout.

In the follow mode, the same word is used for accumulation and readout storage. In this case, the follow input 80 is true and therefore the latch line 82 is false. When the latch line 82 is false both of the And gates 260 and 261 are unable to provide true outputs. The follow input 80 provides a true input through the follow line 81 to the And gate 262. Upon the occurrence of the major clock pulse $M_A$ on the input 75, a true output is provided from the And gate 262 through the Or gate 263 to the output line 78 thereby indicating that the word defined by the clock pulse $M_A$ is to be stored for readout. It will be recalled that in the follow mode (with the follow input 80 true) the $\alpha$ line 66 is true which enables the And gate 241 in the data justifier 38 to provide a true output upon the occurrence of the major clock pulse $M_A$. Thus, it will be seen that in the follow mode that the same word (defined by the clock pulse $M_A$) is used for accumulation and for readout storage.

According to an important feature of the present invention, delay lines are employed for the accumulation and storage of data. The accumulator and logic 30 discussed in connection with FIG. 1 is shown in detail in FIGS. 6a through 6c when arranged together as illustrated in FIGS. 6d. FIG. 6c additionally illustrates in detail the readout pickoff 54. Referring now to FIG. 6a in particular, the control logic for the accumulator receives the summation minor clock pulses $\Sigma_m$ on the input line 44 and the minor clock pulse $m_6$ on the input line 45. Also received are the $\overline{\text{add one}}$ and $\overline{\text{add two}}$ inputs on the respective lines 42 and 43 from the input synchronizer 25 (FIG. 3). The $\overline{\text{add one}}$ and $\overline{\text{add two}}$ inputs control data entry into the particular word and character defined by the add entry pulse $m_i(M_A/M_B)$. The clear input on the line 70 controls the clearing, or resetting, of particular words in the delay lines during recycling. For example, if the word defined by the major clock pulse $M_A$ is to be used for accumulation, it is cleared before accumulation therein. The summation minor clock pulses $\Sigma_m$ are employed for synchronization. Except for its use in overflow control, the minor clock pulse $m_6$ is employed to prevent a carry from one word to the next. It will be apparent, that in any counting or accumulation operation that carries must be provided between lines, and from character to character, but not from one word to the next.

Accumulator and logic

FIG. 6a discloses the logical components for control of the accumulator, and FIGS. 6b and 6c illustrate the actual accumulator. The delay line portion of the accumulator is shown in FIG. 6c. Referring first to the actual accumulator (as distinguished from the logic for controlling the accumulator shown in FIG. 6a) a plurality of And gates, Or gates, inverters and flip-flops are employed for the entry of data into the delay lines and for the recirculation of the contents thereof. And gates 270 through 279, Or gates 280 through 284, inverters 285 through 289, tunnel diode flip-flops 290 through 294, and inverters 295 through 299 in FIG. 6b control the gating of data into the accumulator delay lines. Five delay lines 301 through 305 which are weighted "1," "2," "4," "6" and "8" are illustrated in FIG. 6c.

Turning back to FIG. 6b, the And gates 270, 272, 274, 276 and 278 may be termed the recirculate gates since these particular And gates control the recirculation of data in the delay lines 301 through 305, respectively. The And gates 271, 273, 275, 277, and 279 may be termed the Add And gates since these particular gates control the entry of new data into the respective delay lines 301 through 305. The outputs of the And gates 270 and 271 are connected through the Or gate 280 and the inverter 285 to the set input of the tunnel diode flip-flop 290. The zero output of the flip-flop 290 is connected through the inverter 295 to the delay line 301. In a similar manner, the outputs of the And gates 272 and 273 are connected through the Or gate 281 and the inverter 286 to the set input of the tunnel diode flip-flop 291. The zero output of the flip-flop 291 is connected through the inverter 296 to the delay line 302. In an identical manner, the remaining And gates 274 through 279, the Or gates 282 through 284, the inverters 287 through 289, the flip-flops 292 through 294 and the inverters 297 through 299 are connected with the delay lines 303 through 305.

When all inputs to the And gate 270 are true, the flip-flop 290 is set thereby recirculating the particular bit of information in the delay line 301. If all inputs to the And gate 271 are true, the flip-flop 290 is set to enter a new bit of data into the delay line 301. The remaining delay lines 302 through 305 are operated in a similar manner. It should be noted at this point that in certain instances both of the set and reset inputs of a flip-flop 290 through 294 may be true at the same time. These are tunnel diode flip-flops, which will be discussed in greater detail subsequently in connection with a description of FIG. 7, in which a true set input prevails over a true reset input. Thus, if true set and reset inputs occur at the same time, the flip-flop is switched to its set state.

The outputs of the delay lines 301 through 305 (FIG.

6c) are applied through respective inverters 308 through 312 to the accumulator output lines 48 through 52, respectively. The output lines 48 through 52 are applied to the readout pickoff 54 for the readout of data which will be discussed subsequently, and are returned as inputs to the respective recirculate And gates 270, 272, 274, 276 and 278 in FIG. 6b which control the recirculation of delay line data.

Bi-quinary coding may be employed in the accumulator of the present invention. The term bi-quinary coding relates to a combination of binary and quinary coding. In the usual case, weightings of "1," "0," "2," "4," "6" and "8" are employed. According to an additional feature of the present invention, a delay line for the "0" weighting and its associated control components are not required in counters or accumulators constructed in accordance with the teachings of the present invention. In quinary coding, only one bit weight "0," "2," "4," "6" or "8" is true at a given time. The "0" bit weight may be reconstructed by an inverting Or gate 316 (FIG. 6b) which provides a true output only when all of the bit weights "2," "4," "6" and "8" are false. A similar scheme may be employed in the readout of data as will be discussed subsequently.

Each of the And gates 270 through 279 receives the summation minor clock pulses. The summation minor clock pulses $\Sigma_m$ are applied on an input line 44 in FIG. 6a. These pulses are delayed slightly by a delay device 320 to compensate for preceding delays in other logical components. A typical delay is one-half character time and may be provided by a delay line. The delayed summation minor clock pulses (labeled C) are applied on a line 321 to each of the And gates 270 through 279 (FIG. 6b), and to each of the reset inputs of the flip-flops 290 through 294. These summation minor clock pulses provide the necessary synchronization for data entry (new input data or recirculated data) into the accumulator delay lines.

The $\overline{\text{clear}}$ input is applied through the line 70 (FIG. 6a) to And gates 324 through 327 in FIG. 6b. The $\overline{\text{clear}}$ signal and the And gates 324 through 327 allow appropriate words defined by each of the clock pulses $M_A$, $M_B$ or $M_C$ to be cleared at certain times. When the $\overline{\text{clear}}$ line 70 is true, data is entered into the delay lines, and when the $\overline{\text{clear}}$ line 70 is false (indicating Not $\overline{\text{clear}}$ and hence a true clear signal), the entry of data into the delay lines is prevented by the And gates 324 through 327. When data is not gated through any of the And gates 324 through 327, the corresponding flip-flop 290 through 294 remains reset by the summation minor clock pulses C thereby entering no data (or entering a zero) in the associated delay line or lines.

In summary, the logical components shown in FIG. 6b control the entry of or the recirculation of data in the delay lines 301 through 305 shown in FIG. 6c. The Or gate 316 controls the regeneration of the bit "0," and the And gates 324 through 327 control the clearing of the desired word or words in the delay lines. Bit weights "1," "0," "2," "4," "6" and "8" are provided by the accumulator with no delay line being required for the "0" weight as discussed previously. The decimal value of a particular character is then the sum of the line weightings at that particular character time which are true. This is shown in the following table:

BIT WEIGHT

| Decimal value | "1" | "0" | "2" | "4" | "6" | "8" |
|---|---|---|---|---|---|---|
| 0 | 0 | 1 | 0 | 0 | 0 | 0 |
| 1 | 1 | 1 | 0 | 0 | 0 | 0 |
| 2 | 0 | 0 | 1 | 0 | 0 | 0 |
| 3 | 1 | 0 | 1 | 0 | 0 | 0 |
| 4 | 0 | 0 | 0 | 1 | 0 | 0 |
| 5 | 1 | 0 | 0 | 1 | 0 | 0 |
| 6 | 0 | 0 | 0 | 0 | 1 | 0 |
| 7 | 1 | 0 | 0 | 0 | 1 | 0 |
| 8 | 0 | 0 | 0 | 0 | 0 | 1 |
| 9 | 1 | 0 | 0 | 0 | 0 | 1 |

As will be seen subsequently, the accumulator is essentially separated into two separate systems. One consisting of the "1" line 301 and the other consisting of the "2," "4," "6" and "8" lines 302 through 305 and the output of the Or gate 316. This provides essentially a scale of two device (the "1" line) which operates a scale of five device (the remaining lines).

Turning again to FIG. 6a in which the logic for controlling the accumulator is shown, the $\overline{\text{add one}}$ signal is applied on the line 42 to an Or gate 336. The output of the Or gate 336 is applied on a line 337 labeled $\overline{A}$ to the And gate 324 in FIG. 6b. This line 337 also is connected through an inverter 338 to the And gate 325 in FIG. 6b. When the line 337 is true, it indicates the absence of general add one command into the word and character defined by the add entry pulse provided by the data justifier 38 (FIG. 5). Thus, assuming that the $\overline{\text{clear}}$ line 70 (FIG. 6b) is true and the $\overline{A}$ line 337 is true, the And gate 324 provides a true output to the And gate 270. Thus, the And gate 270 is conditioned (upon the occurrence of delayed summation minor clock C) to recirculate a bit in the "1" delay line 301. If the $\overline{A}$ line 337 is false (indicating a general add one command), the And gate 325 provides a true output to cause the And gate 271 to add one to the "1" delay line 301. This incrementation of the delay line 301 occurs only as defined by the delayed summation minor clock pulses and if the particular bit from the delay line (defined by minor clock pulses $m_1$ through $m_6$) is false, or a zero, as would be indicated by the true condition of a $\overline{1}$ input provided on a line 340 to the And gate 271. The $\overline{1}$ signal is provided on the line 340 by the "1" line output 48 (FIG. 6a) and an inverter 341. Hence, the bit in the word defined by the add entry pulse may be recirculated if the $\overline{A}$ line 337 (FIG. 6b) is true, or incremented by one if the $\overline{A}$ line 337 is false and the $\overline{1}$ line 340 is true (assuming that the necessary minor clock C and clear inputs are present). In this latter case, if the $\overline{1}$ line 340 is false (indicating that this particular bit is already true or a one), the delay line is not incremented and the bit is lost to thereby store a zero. That is, if a particular bit is already a one and a one is to be added to this bit, it is changed to a zero. This is normal binary logic in which one bit weighting switches from one to zero, to one, to zero, etc., upon the occurrence of each input pulse or event. In the latter case previously discussed (the bit was a one and an add one was indicated) a carry will be generated. This carry is to the next higher bit position (bit position when speaking of a single delay line, and character position or decade when speaking of a plurality of delay lines).

The generation of carries in the "1" line 301 is controlled by And gates 346 and 347, an Or gate 348, an inverter 349, a delay device 350, inverters 351 and 352, and the Or gate 336 in FIG. 6a. The output line 337 from the Or gate 336 is connected through an inverter 354 and a general add "1" line 355 to the And gate 347. The And gate 347 also receives the "1" and "8" outputs of the accumulator (derived from the respective inverters 308 and 312) on the respective lines 48 and 52. The minor clock pulse $m_6$ is applied on the input line 45 through an inverter 358 and a line 359 to the And gate 347. Thus, $\overline{m_6}$ is applied to the And gate 347.

According to a feature of the present invention, the general add one line 355, the "1" line 48 and the "8" line 52 provide a general carry signal. When these three lines are true, a general carry is indicated for providing a carry between lines, or between characters in the lines in any of the words defined by the major clock pulses $M_A$, $M_B$ or $M_C$. The $\overline{m_6}$ input is provided to the And gate 347 to prevent such a carry from occurring between words. That is, if a general carry is indicated at minor clock time $m_6$ a carry would be provided between words and, therefore, this clock pulse is employed to prevent such a carry. The output of the And gate 347 will be true whenever the numerical value of any character defined by the respective minor clock pulse $m_1$ through $m_5$ is 9 (the "1" and the "8" outputs are true) and the general add one line 355 is true (because the $\overline{\text{add one}}$ command is false, i.e., add one is true).

The output of the And gate 347 is applied through the Or gate 348 and the inverter 349 to the delay device 350. The delay device 350, which may be a delay line or other suitable delay device, provides a one character delay so that a carry generated by one character is carried to the next higher order character. The output of the delay device 350 is applied through inverters 351 and 352 to the Or gate 336. One inverter is utilized to provide the required amplification and results in inversion, and the second inverter may be provided to reinvert the output of the delay device 350 as required by the following logical components. When the output of the inverter 352 is true no incrementation occurs (i.e., the $\overline{\text{A}}$ line 337 from the output of the Or gate 336 would be true). Incrementation of the "1" delay line 301 is indicated when the output of the inverter 352 is false.

A similar operation is provided for generating a carry when the portion of a character in the quinary lines "2," "4," "6" and "8" has a numerical value of eight and is instructed to increment by two. If this character is to be incremented by two $(8+2=10)$ a carry must be generated to the next higher order character. The $\overline{\text{add 2}}$ line 43 is connected through an inverter 362 and a line 363 to the input of the And gate 346. The "8" output of the accumulator is applied by the line 52 to the input of this And gate 346. Thus, when an $\overline{\text{add 2}}$ signal occurs on the input 43 (and hence a true add 2 command at the output of the inverter 362) along with a true input on the line 52, the And gate 346 provides a true output. The output of the And gate 346 is applied through the Or gate 348, inverter 349, delay device 350, inverters 351 and 352 and the Or gate 336 to provide a carry to the bit in the next higher order character in the "1" delay line 301. Hence, if the numerical value of a character in the accumulator is nine $(8+1)$ and an add 1 command occurs, a carry of one is generated to the next higher order character. If the numerical value of this character is eight and an add 2 command occurs, a carry of one is supplied to the next higher order character. A carry to the next higher order character also is provided if the numerical value of the lower order character is nine $(8+1)$ and an add 2 command occurs (this is provided by the And gate 346 which requires only true inputs of add 2 and "8" to provide a true output). In this latter case the one in the "1" delay line 301 is not disturbed so that the numerical result $(9+2)$ accumulated is eleven. Thus, the And gates 346 and 347, and the delay device 350 provide for the generation of appropriate carries between bits (or characters when speaking of all delay lines) in the "1" delay line 301.

General add 2 commands which are employed for incrementing the "2," "4," "6" and "8" delay lines 302 through 305, respectively, are generated by And gates 368 and 369, and Or gate 370 and an inverter 371. The $\overline{\text{A}}$ line 337 and the $\overline{\text{add 2}}$ line 43 are connected to the And gate gate 316). If, for example, the "2," "4," "6" and "8" bits of a character at the output of the accumulator are all false (zeros) and the output of the And gate 326 is true (general add 2 is true and $\overline{\text{clear}}$ is true) the And gate 273 which receives the inverted output when the $\overline{\text{A}}$ line 337 is true and the $\overline{\text{add 2}}$ line 43 is true. The And gate 369 provides a true output when the $\overline{\text{1}}$ line 340 is true and the $\overline{\text{add 2}}$ line 43 is true. The logical components 368 through 371 function to provide a true output (general add 2) on the line 372 when add 2 is true ($\overline{\text{add 2}}$ is false) or when both the $\overline{\text{A}}$ line 337 and the $\overline{\text{1}}$ line 340 are false. Stated another way in boolean notation, the line 372 is true when 1 and A, or add 2 are true.

When the general add 2 output on the line 372 is true, and the $\overline{\text{clear}}$ line 70 (FIG. 6b) is true, the And gate 326 in FIG. 6b provides a true output to And gates 273, 275, 277 and 279. The output of the And gate 326 controls the carry between the "2," "4," "6" and "8" delay lines 302 and 305 (and the fictitious "0" line provided by the Or gate 316). If, for example, the "2," "4," "6" and "8" bits of a character at the output of the accumulator are all false (zeros) and the output of the And gate 326 is true (general add 2 is true and $\overline{\text{clear}}$ is true) the And gate 273 which receives the inverted output of the Or gate 316 provides a true output at summation minor clock C time. The true output of the And gate 273 will cause a one to be stored in the "2" delay line 302. Thus, assuming the necessary clock and clear inputs when the "0" output is true, a one is stored in the "2" line 302 when the add 2 command is true, or when the general add 1 command is true and the output of the "1" delay line 301 is true. This operation provides for the incrementation of the "2" delay line 302 by two for the accumulation of two input pulses from the input synchronizer, or for the incrementation by two when the corresponding character position in the "1" delay line 301 is a one and a general add one command occurs.

A one may be inserted in the remaining delay lines 303 through 305 (FIG. 6c) in a similar manner if the corresponding bit position in the preceding delay line is true. For example, the "4" delay line 303 will have a one inserted at a delayed minor clock time when the output of the And gate 326 is true and the corresponding bit in the preceding "2" line 302 is true. This is indicated by the inputs to the And gate 275 which will provide a true output under these stated conditions.

An inverting And gate 380 and an Or gate 381 in FIG. 6a are provided to supply a $\overline{\text{general add 2}}$ to allow the recirculation of data in the delay lines. The general add 1 line 355 and the "1" output line 48 are connected as inputs to the And gate 380. The output of the inverting And gate 380 is connected to the input of the Or gate 381. Also, the $\overline{\text{add 2}}$ line 43 is connected to the Or gate 381. Thus, when the $\overline{\text{add 2}}$ command is true (add 2 is false), or when general add 1 and the output of the "1" line are both true, the line 382 provides a signal to allow recirculation of the data in the delay lines. The line 382 is connected to the And gate 327 in FIG. 6b. This And gate also receives the $\overline{\text{clear}}$ line 70. The output of the And gate 327 is connected to each of the And gates 272, 274, 276 and 278. The output of the And gate 327 thus provides an enabling input for the And gates 272, 274, 276 and 278 when $\overline{\text{general add 2}}$ is true (assuming the other necessary $\overline{\text{clear}}$ and minor clock inputs). For example, if the output of the And gate 327 is true, the summation minor clock line 321 is true and one of the lines 49, 50, 51 or 52 (which supply the "2," "4," "6" and "8" outputs of the accumulator) is true one of the respective And gates 272, 274, 276 or 278 provides a true output which in turn will set one of the respective flip-flops 291 through 294 to re-enter the bit of data to be recirculated.

The operation of the accumulator and logic may now be summarized. The accumulator can be considered as being separated into two separate systems, one consisting of the "1" delay line 301 and the other consisting of the "2," "4," "6" and "8" delay lines 302 through 305 (and the "0" generated by the Or gate 316). An add command may be generated at any character clock ($m_1$ through $m_6$). This command always changes the state of the "1" line 301. When an add 1 command is generated and the "1" delay line 301 is true at that time, the "1" line is made false and an internal add 2 command is generated (by And gate 380). This latter command increases the decimal value of the system by two by transferring the true state of any line in the "0," "2," "4" and "8" system to the next higher weighting. If it is desired that the decimal value be increased by two external commands, an add 2 command can be externally generated. This latter command cannot coincide with an add 1 command (controlled by the input synchronizer).

When the decimal value of a character is nine (8+1) and an add 1 command occurs, the true state of the "8" line is transferred through a one character delay (provided by the delay device 350 iXn FIG. 6a) to the next character position and creates an add 1 command. This may be termed a serial carry as it creates an increase in decimal value of ten.

These instructions produce a scale of two (the "1" line) which operates a scale of five (the "2," "4," "6" and "8" lines and the output of the Or gate 316) producing a scale of ten at one particular character clock. When the capacity is exceeded at one particular character clock, a carry is generated which creates an add 1 at the next higher order character clock. This increases the capacity to ten to the "$n$th" power, where "$n$" is the number of character clocks (six in the example given herein.) Since a maximum of six character clocks is disclosed herein, a maximum of six characters per word limits the accumulation to one million.

The input to a line is generated by a flip-flop (290 through 294 in FIG. 6b) which can be set by a system of And gates 270 through 279. If a set pulse to a flip-flop fails to occur at delayed summation minor clock time, the flip-flop is reset by this minor clock. This produces a "non-return-to-zero" input to the delay lines. If desired, the delay lines 301 through 305 (FIG. 6c) may be separated into two parts with interstage amplification to aid in maintaining bandwidth.

The set pulses to the flip-flops 290 through 294 are generated by either of two And gates, one of which is employed to recirculate the data in the lines, and the other of which is employed to modify the data at the occurrence of an add command. Each gate has the summation minor clock pulses (delayed) as one input such that the set pulses occur at the appropriate clock time if all other inputs to the gate are true. This maintains consistent set and reset times as established by the summation minor clock pulses. The recirculate And gate 270 for the "1" line is instructed to recirculate if an add 1 is not desired and if the output of the "1" line is true. If the "1" line is false, the flip-flop 290 will be reset generating a false (zero) input. The And gate 271, which indicates the data to be added to the line, is instructed to produce a set output if add 1 is desired and the "1" line is false. This increases the decimal value in the line by one. If the "1" line were true, the flip-flop 290 resets producing a false input to the line. Under these conditions the And gates 368 and 369 (FIG. 6a) cause a general add 2 command to be produced on the line 372 which increases the decimal value in the accumulator by two. This is actually only an increase by one since the "1" was made false.

The operation of the recirculate gates 272, 274, 276 and 278 for the quinary lines is similar to that for the binary "1" line. The add gates 273, 275, 277 and 279 differ in that they transfer data from line to line, but never maintain more than one true bit at any time. This is obtained by resetting the lines (clear) such that all are false. The "0" line (generated by the Or gate 316) is then true. An add two command makes the "2" line true, since all inputs to the add gate 273 are true thereby increasing the decimal value by two. The "0" line is now false since the "2" line is true. The next add two command makes the "4" line true based upon the presence of a true bit in the "2" line. This transfer continues until an add two command is generated when the "8" line is true. At this time all of the line inputs are false, but the And gate 347 (FIG. 6a) provides a true output to generate a carry to the next higher order character (except at minor clock $m_6$). The delay provided by the delay device 350 thereby provides an add one command at the next summation minor clock time which increases the decimal contents of the accumulator by ten.

When the accumulator overflows (exceeds capacity) And gates 390 and 391 and an Or gate 392 provide an overflow indication on the output line 47. The line 363 (add 2), the line 52 ("8") and the line 45 (minor clock pulse $m_6$) are each connected as inputs to the And gate 390. Additionally, the sync control line 46 is connected to the And gate 390. Thus, at minor clock $m_6$ when the add 2, "8" and sync control inputs are true, an overflow indication occurs. The sync control input on the line 46 indicates which of the words (defined by the clock pulse $M_A$ or the clock pulse $M_B$) is being used for accumulation. In a similar manner, the And gate 391 provides an overflow indication at minor clock time $m_6$ when the general add 1 command on the line 355 is true, the "1" line is true, the "8" line is true and the sync control line 46 is true. The overflow output signal may be used to operate an overflow indicator, or it may be employed to operate a readout for a seventh decade or digit. In the latter case, outputs up to two megacycles could be indicated.

*Readout pickoff*

The readout pickoff 54 is shown in FIG. 6c. This device includes a plurality of And gates 400 through 429 which are employed to interrogate the outputs 48 through 52 of the accumulator to read out the characters of the words defined by the major clock pulses $M_A$ or $M_B$. The And gates 400 through 429 are controlled by And gates 431 through 436. The readout word control from the readout control 74 is applied on the line 78 to each of the And gates 431 through 436. The minor clock pulses $m_1$ through $m_6$ are applied to the respective And gates 431 through 436. Thus, the And gates 431 through 436 serve to select the word (defined by the readout word control signal on the line 78 to select the word defined by the major clock pulse $M_A$ or $M_B$) and the characters in that word (by the minor clock pulses $m_1$ through $m_6$). The output of the And gate 431 is connected to each of the And gates 400 through 404. The "1," "2," "4," "6" and "8" outputs 48 through 52 of the accumulator are connected to the respective And gates 400 through 404. At minor clock time $m_1$ the first character of the word defined by the signal on the readout word control line 78 is read from the accumulator to a readout device. In a similar manner, the And gate 432 enables the And gates 405 through 409 to read out the next higher order character at minor clock time $m_2$. The succeeding higher order characters defined by the minor clock pulses $m_3$ through $m_6$ are read out in a similar manner. Thus, the And gates 400 through 404, 405 through 409, 410 through 414, 415 through 419, 420 through 424 and 425 through 429 respectively provide the readout of the characters in the accumulator. The "0" output is reconstituted by employing an Or gate (like the Or gate 316 in FIG. 6b). Storage capacitors may be connected between the outputs of the And gates 400 through 429 and ground to maintain a constant voltage output although they are operated only once each microsecond. The "0," "2," "4," "6" and "8" outputs thus derived may be employed to respectively operate pairs of readout devices providing numerical indicia 0-1, 2-3, 4-5, 6-7, and 8-9 with the "1" output providing odd and even selection. Any type visual readout device may be employed as desired. In order to provide an 8-4-2-1 binary coded decimal output, the bi-quinary "2" and "6" outputs may be or'ed together to provide the BCD "2" output, the bi-quinary "4" and "6" outputs or'ed together to produce the BCD "4" output, with the bi-quinary "1" and "8" outputs providing the respective BCD "1" and "8" outputs. The following truth tables illustrate the bi-quinary to decimal conversion and the bi-quinary to 8–4–2–1 binary coded decimal conversions (the + indicates Or):

Bi-quinary:                                                   Numerical

| Bi-quinary | Numerical |
|---|---|
| $(0)(\bar{1})$ | 0 |
| $(0)(1)$ | 1 |
| $(2)(\bar{1})$ | 2 |
| $(2)(1)$ | 3 |
| $(4)(\bar{1})$ | 4 |
| $(4)(1)$ | 5 |
| $(6)(\bar{1})$ | 6 |
| $(6)(1)$ | 7 |
| $(8)(\bar{1})$ | 8 |
| $(8)(1)$ | 9 |

| Bi-quinary | 8–4–2–1 binary coded decimal |
|---|---|
| 1 | 1 |
| 6+2 | 2 |
| 6+4 | 4 |
| 8 | 8 |

It is to be understood that conversions to other codes may be provided if desired.

Time base selector

Returning now to FIG. 3, the time base selector 17 is shown therein in detail. The time base selector 17 includes And gates 446 and 447, and Or gates 448, And gates 449 through 453 and an Or gate 454. The general carry (1, 8 and A) from the accumulator logic (FIG. 6a) is supplied on the respective lines 48, 52 and 355. The major clock pulse $M_C$ is applied on the input 94 to each of the And gates 446 and 447. The And gate 447 additionally receives the clear command on the input 71 from the control and recycle logic (FIG. 4). The outputs of the And gates 446 and 447 are connected through the Or gate 448 to each of the And gates 449 through 453. Enable inputs 459 through 463 are connected to the respective And gates 449 through 453. The minor clock pulses $m_1$, and $m_3$ through $m_6$ are applied on respective inputs 95, and 96 through 99 to the And gates 453, 452, 451, 450 and 449, respectively.

It will be recalled, that the time base selector 17 responds to serial carries between characters in the time base word defined by the major clock pulse $M_C$ and provides the desired time base output. For example, assuming that a time base of one second is desired, the enable input line 459 is made true. Upon the occurrence of a general carry (the lines 48, 52 and 355 are true) from the sixth character (defined by the minor clock pulse $m_6$) of the time base word (defined by the major clock pulse $M_C$), output pulses are provided on the output line 16 each second. These output pulses are thus defined by a general carry occurring from the most significant character (the sixth character) of the time base word (defined by the major clock pulse $M_C$). Other time bases of 0.1 second, 10 milliseconds, 1 millisecond, and 1 microsecond may be chosen by enabling one of the respective lines 460 through 463. A general carry from the fifth character of the time base word provides a time base of 0.1 second, a general carry from the fourth character of the time base word provides a time base of 10 milliseconds, etc. No logical components are shown in FIG. 3 for deriving a time base pulse based on a general carry from the second character of the time base word because this particular time base is not generally employed.

The And gate 447 provides an output upon the occurrence of a clear command on the input line 71 and the occurrence of the major clock pulse $M_C$ on the line 94. This serves to provide an initial time base pulse (a forced time base pulse) when the counter is initially started, or upon recycle. As will be discussed in greater detail subsequently, the counter recycles after a predetermined selectible time period (such as 0.1 to 10 seconds) which is employed to hold the output data for readout for a period long enough for it to be viewed or a printer to operate, and in the meantime base pulses will still occur. Accordingly, at the end of the recycle time a fictitious time base pulse is generated to restart the cycle of the counter properly.

Control and recycle logic

The control and recycle logic 27 shown in FIG. 4 controls the recycling of the counter. The zero outputs of the start and gate flip-flops 220 and 221 are connected as inputs to an And gate 480. The output of the And gate 480 is connected to a ready delay multivibrator 481, the output of which is connected to the set input of a conventional recycle flip-flop 482. The zero output of the recycle flip-flop 482 is returned as an input to the And gate 480. Thus, when the start flip-flop 220, the gate flip-flop 221 and the recycle flip-flop 482 are in their zero state, the And gate 480 provides a true output. The ready delay 481 is normally held off by a false input, but is triggered by a true input and provides a five millicycle delay after which the recycle flip-flop 482 is set. The ready delay 431 is thus triggered at the occurrence of the trailing edge of the gate control signal on the line 36.

The one output of the recycle flip-flop 482 is connected to a variable recycle delay multivibrator 483 which provides an output pulse after a predetermined selected delay such as 0.1 to 10 seconds. This variable delay may be set by a variable resistance in the multivibrator, and it is employed to provide the necessary display time for visually reading the readout device, or for print-out of accumulated data. The output of the recycle flip-flop 482 also may be utilized to provide a print command signal to indicate to an external printer that accumulated data may be printed.

After the selected delay, the output pulse from the variable recycle delay multivibrator 483 is inverted by an inverter 486 and employed to set a clear sync flip-flop 487. The clear sync flip-flop 487 is a tunnel diode flip-flop which explains the reason for the inverter 486. The output of the inverter 486 also is connected to a reset And gate 488 and to an inverting And gate 489. The zero output of the clear sync flip-flop 487 is applied through an inverter 490 to the And gate 489. The major clock pulse $M_A$ and the minor clock pulse $m_1$ are applied on the respective inputs 60 and 63 to the And gate 489. The output of the And gate 489 is applied to the set input of a clear control tunnel diode flip-flop 492. As will be apparent by examining the inputs to the And gate 489, the clear control flip-flop 492 will be set after the recycle delay when the clear sync flip-flop 487 is set and the clock pulses $M_A$ and $m_1$ occur. The clear control flip-flop 492 is subsequently reset upon the occurrence of the clock pulses $M_A$ and $m_1$ and thereby provides a precisely timed (one microsecond) output pulse. The zero output of the clear control flip-flop 492 is inverted by an inverter 493 to provide the clear command on the output line 71. The clear command on the line 71 is therefore true for the precisely timed interval of one microsecond between the occurrences of the clock pulses $M_A$ and $m_1$. Resetting of the clear control flip-flop 492 is accomplished by means of an And gate 494.

The clear command line 71 is connected to an And gate 496. The major clock pulse $M_B$ also is applied to the And gate 496 by means of the input 61. The And gate 496 is an inverting And gate and provides a $\overline{control\ reset}$ output on the line 72. The $\overline{control\ reset}$ output thus occurs when the clear command is true and the major clock pulse $M_B$ occurs. This output is employed to set the start flip-flop 220, reset the gate flip-flop 221 and reset the recycle flip-flop 482. This output is also inverted by an inverter 497 and employed to reset the clear sync flip-flop 487. Additionally, the $\overline{control\ reset}$ signal on the line 72 is applied to the transfer control 68 (FIG. 5) to prevent the triggering of the transfer device delay single shot 231 during control reset time. The "bar" is used over the words "control reset" to indicate that a true control reset output of the And gate 496 does not cause reset to occur. When true inputs are applied to the And gate 496 its output is false since it is an inverting And gate, and this false output is termed true $\overline{\text{control reset}}$ which causes the desired resetting to occur.

The clear command line 71 also is connected to an inverting And gate 500. An And gate 501 receives the major clock pulses $M_A$ on the line 60, and an α input on the line 66 from the transfer control flip-flop 232 in FIG. 5. An And gate 502 receives the major clock pulses $M_B$ on the line 61, and the β input on the line 67 from the transfer control flip-flop 232 in FIG. 5. The outputs of the And gates 501 and 502 are connected to an Or gate 503. The major clock pulse $M_C$ is also applied on the line 62 to the Or gate 503. The output of the Or gate 503 is connected to the And gate 500 which provides the $\overline{\text{clear}}$ output to the accumulator on the output line 70. The major clock pulse $M_C$ on the line 62, the Or gate 503 and the And gate 500 provide the necessary clear signal to the accumulator for clearing the time base word upon the occurrence of the clear command during recycling. The And gates 501 and 502 likewise function to clear one of the words defined by the clock pulse $M_A$ or $M_B$ during this time. For example, if the word defined by the major clock pulse $M_A$ is being used for accumulation in the latch mode, the α line 66 is true. In this case it is desired to clear the word defined by the major clock pulse $M_A$ prior to accumulation therein. This word is cleared prior to the occurrence of a general add command to the accumulator. The word defined by the major clock pulse $M_B$ will not be cleared since this is now being used as a storage word while the word defined by the major clock pulse $M_A$ is being used for accumulation. In a similar manner, the word defined by the major clock pulse $M_B$ will be cleared prior to accumulation therein. The time base word will be cleared each cycle of operation. In the follow mode, a similar operation occurs but it does not alternate between the two words defined by the major clock pulses $M_A$ and $M_B$. That is, only the word defined by the major clock pulse $M_A$ is cleared and accumulated in successively.

In order to better understand the over-all sequence of operations provided by the control and recycle logic 27 in FIG. 4 and other components within the system, assume that the counter is set for accumulating events per unit time for one second. The data gate 164 in FIG. 3 is opened for one second. The recycle rate set by the variable recycle delay multivibrator 483 in FIG. 4 determines how long the gate 164 is closed. In other words, this recycle rate delay determines how long (such as, ten seconds—between closing and opening of the data gate) the accumulated answer is held and displayed by the readout device during the recycle delay and while a new measurement is being made. Assuming also that the previous measurement was made in the word defined by the major clock pulse $M_B$ (this word is now storing the accumulated events for readout) the next accumulation will be made in the word defined by the major clock pulse $M_A$. The words defined by the major clock pulses $M_A$ and $M_C$ are cleared, and a fictitious start pulse is generated. This is generated by the clear command on the line 71 and the occurrence of the major clock pulse $M_C$ on the line 94 which are applied to the And gate 447 in the time base selector 17. The start pulse opens the data gate 164. The stop pulse will subsequently be generated by the And gate 446 operating in conjunction with the And gate 449 which selects the one second period. At this point, the word defined by the major clock pulse $M_A$ has been accumulating events for one second. At the occurrence of the stop pulse, the transfer single shot 231 in FIG. 5 triggers the transfer flip-flop 232 which indicates that the word defined by the clock pulse $M_B$ will next be used for accumulation. This allows the word defined by the clock pulse $M_B$ which was just accumulated in to be read out. At the end of the ready delay provided by the multivibrator 481 in FIG. 4, the recycle flip-flop 482 is triggered which starts the variable delay provided by the multivibrator 483. At the end of this variable delay, the words defined by the major clock pulses $M_B$ and $M_C$ are cleared. This clears the word defined by the major clock pulse $M_B$ so that it is ready for accumulation, and clears the time base word defined by the major clock pulse $M_C$ in order to get the time base output started again.

The operations for performing period measurements are similar to those previously discussed. However, in performing a period measurement the input events applied to input terminal 10 (FIG. 3) provide the start/stop pulses on the line 26 in FIG. 3; whereas, the time base pulses are accumulated rather than the input events. It will be understood that the appropriate enable inputs may be applied to either of the lines 162 or 163 in the time base selector 17 in FIG. 3 and the input lines 255 and 252 in the data justifier 38 in FIG. 5. Likewise, appropriate enable inputs may be applied to the time base selector 17 and the data justifier 38 to provide the measurement of events for the selected interval of time.

Although a bi-quinary arrangement of the delay lines 301 through 305 (FIG. 6d) and the associated logic for control thereof has been described and discussed in connection with an exemplary embodiment of a counter utilizing the concepts of the present invention, other codings and arrangements may be employed as desired. For example, four delay lines may be utilized in a binary coded decimal system. Furthermore, although three words have been discussed herein as defined by the major clock pulses $M_A$, $M_B$ and $M_C$ for performing the functions of accumulate, storage and time base generation, different numbers of these words may be employed if desired. For example, if it is not desired to read out during a subsequent accumulation, the storage word is not required. Additionally, it may be desired to utilize more than three words to allow concurrent accumulation of different events as well as the subsequent storage thereof for providing deviation or similar measurements. Fewer or greater decades (characters) may be provided by using different delay lines and a different number of minor clock pulses to define the decades. It will be apparent to those skilled in the art, that the concepts discussed herein may be utilized to provide a unique and versatile counting or accumulating device. It also will be apparent to those skilled in the art in view of the previous discussions that the logic of the accumulator can be extended to include subtraction as well as addition in order to provide a reversing counter. The capabilities of the counter can be extended by preceding the input with a prescaler. However, this hampers the justification of data, and it would be more desirable to employ more flip-flops (such as the flip-flops 177 and 185) in the input synchronizer to provide scaling of the input pulses and the generation of appropriate add one . . . add n commands.

The use of bi-quinary coding in the accumulator, and the use of a regenerated "0" not only saves components but prevents the accumulator from filling with more than one true bit in the quinary system at any one time. This is accomplished by the fact that all of the quinary lines must be false in order for the "0" output to be true. The true condition of the "0" output is required before additional true bits can be added to the quinary lines. In the event of multiple true bits in the quinary system, add 2 commands transfer the true bits from line to line until they have been dissipated. At this time, the "0" output becomes true and allows proper bits to be added by add 2 commands. The bi-quinary coding system also aids in simplifying the decoding to decimal readout form, and allows easy decoding to any binary coded decimal form either positive or negative true.

FIG. 7 is a circuit diagram of the And gates, Or gates, inverters and tunnel diode flip-flops employed for driving a delay line. As an example, these may be the And gates 270 and 271, the Or gate 280, the inverter 285, the tunnel diode flip-flop 290 and the inverter 295 shown in FIG. 6b for driving the "1" delay line 301. The And gates 270 and 271 are conventional diode type And gates connected to a conventional diode Or gate 280. The inverter 285 is provided by a single transistor 510. The output of the inverter 285 drives the set input of the tunnel diode flip-flop 290. The set input of this flip-flop is connected through a resistance 511 to a tunnel diode 512. The reset input of the flip-flop is connected through a resistance 513 and a diode 514 to the resistance 511. The other terminal of the tunnel diode 512 is connected to the junction of a resistance 515 and a biasing diode 516 (to provide a low impedance at low voltage when the tunnel diode 512 is made of germanium and the transistor 520 is made of silicon). The junction of the resistance 511 and the tunnel diode 512 provides the "0" output of the flip-flop which is connected to the input of the inverter 295. The inverter 295 is provided by a single transistor 520, the collector of which is connected to the "1" delay line 301. The diode 516 may be replaced by a resistance if the tunnel diode 512 and the transistor 520 are made of the same materials, or if the tunnel diode 512 is silicon and the transistor 520 is germanium.

In the tunnel diode 290, the reset command is overridden by the occurrence of a set command. The transistor 510 saturates when the output of the Or gate 280 is true. This essentially removes the source of current from the positive voltage supply thereby resetting the tunnel diode to its low voltage state (analogous to a conducting state). This is the set state of the flip flop. The low voltage state of the tunnel diode causes the transistor 520 to turn off thereby producing a positive true output to the delay line. If the transistor 510 fails to saturate because of a false output from the Or gate 280, the resistance 513 which is connected to the delayed summation minor clock input (the reset input) produces a large current to the positive supply setting the tunnel diode to its high voltage state thereby producing a false output from the inverter 295. The set and reset states are maintained by the bias current generated by the collector resistor connected to the transistor 510. The tunnel diode flip-flop 290 also may be used for the other tunnel diode flip-flops shown and described herein.

It will be understood that although an exemplary embodiment of the present invention has been disclosed and discussed, other applications and arrangements are possible and that the embodiment disclosed may be subjected to various changes, modifications and substitutions without necessarily departing from the spirit of the invention.

What is claimed is:

1. In a device for accumulating data in the form of pulses per unit time, each pulse representing a unit of data, the combination comprising
   a plurality of recirculating storage devices, each device being divided into a plurality of word sections, and each word section being divided into a plurality of binary storage segments,
   first means for generating a first sequence of cyclic clock pulses connected to said storage devices for synchronizing the store and read operations of said storage device in parallel by binary storage segments, a group of binary signals read in parallel from binary storage segments comprising a character,
   second means for generating a second sequence of cyclic clock pulses, one cycle of such clock pulses for each pulse of said first sequence of cyclic clock pulses connected to said storage devices for synchronizing the store and read operations of said storage devices in series by binary storage segments, a sequence of characters being read from a word section comprising a number, the first character representing the least significant digit thereof, and the last character representing the most significant digit thereof,
   an adder connected to said recirculating storage devices to add at least a unit to the contents of the first binary storage segments of a given word section under the synchronizing control of the first one of said second sequence of cyclic clock pulses and a selected one of said first sequence of cyclic clock pulses, and to add a carry propagated from one group of binary storage segments of the selected word to the next under the synchronous control of subsequent ones of said second sequence of cyclic clock pulses, in accordance with a predetermined binary code by which said characters are represented,
   a time base generating means connected to said recirculating storage device for accumulating a first one of said second sequence of cyclic clock pulses under the control of a predetermined one of said first sequence of cyclic clock pulses in a predetermined one of said word sections,
   a time base selector for detecting a carry propagated from one parallel group of binary storage segments of the predetermined word section to the next under the control of a selected one of said second sequence of cyclic clock pulses and the predetermined one of said first sequence of cyclic clock pulses,
   a data gating and input synchronizing means for receiving and storing data input pulses to be accumulated in a given selected one of said word sections,
   transfer control means for selecting one of said word sections for accumulating data during a given accumulating cycle and for selecting another word section for accumulating data during a succeeding accumulating cycle, and
   control and recycle means for initiating an accumulating cycle by clearing said predetermined word section and gating data input pulses from said data gating and synchronizing means to said given selected one of said word sections and, in response to said time base selector, for terminating an accumulating cycle until said predetermined one of said word sections recirculates and is again cleared upon initiation of a subsequent accumulating cycle.

2. Apparatus as defined in claim 1 including
   readout control means connected to said transfer control means for reading out the contents of the one of said word sections upon the other word section being selected for the succeeding accumulating cycle.

3. Apparatus as defined in claim 1 wherein said data gating input synchronizing means includes
   buffer storage means for storing more than one data pulse to be accumulated during a given cycle of said recirculating storage device, and
   control means connected to said adder to add the sum of said data pulses stored therein to the contents of the first binary storage segments of the selected one of said word sections.

4. Apparatus as defined in claim 1 wherein
   said predetermined code by which said characters are represented is an 8–6–4–2–1 weighted binary code, each character representing a decimal digit by the sum of the weighted binary code digits, a decimal zero being represented by all such binary coded digits being equal to zero and all other decimal digits being represented by a binary digit equal to one in not more than two segments the weighted sums of which will not exceed the value of the decimal digit nine, and said adder comprises means for altering the binary value stored in the binary storage segment of least weight assigned thereto of a given plurality of parallel binary storage segments, means for shifting a binary one stored therein to a storage segment of higher assigned weight each time the binary value stored in the binary storage segment having the least weight is altered from one to zero, and means for storing for one clock pulse period of said second sequence of cyclic clock pulses a binary one shifted from the storage segment of highest weight as a carry to be added to the contents of the succeeding plurality of parallel binary storage segments of the same word section.

5. Apparatus as defined in claim 4 wherein said adder includes means for adding a value of two to the contents of a given plurality of parallel binary storage segments by altering a binary zero to a binary one in the binary storage segment of next to least assigned weight thereto of said given plurality of parallel binary storage segments if the binary value in all binary storage segments of greater assigned weight is zero, and shifting a binary one stored in any of said plurality of parallel binary storage segments except the one of least assigned weight.

References Cited
UNITED STATES PATENTS

| | | | |
|---|---|---|---|
| 2,989,236 | 6/1961 | Pouliant et al. | 235—159 |
| 3,007,641 | 11/1961 | Beck et al. | 235—150.31 |
| 3,029,023 | 4/1962 | Beck et al. | 235—150.31 |

MALCOLM A. MORRISON, *Primary Examiner.*

MARTIN P. HARTMAN, *Examiner.*